(12) United States Patent
Kitamura et al.

(10) Patent No.: US 8,457,376 B2
(45) Date of Patent: Jun. 4, 2013

(54) IMAGE PROCESSING APPARATUS, IMAGE PROCESSING METHOD, AND COMPUTER-READABLE RECORDING MEDIUM

(75) Inventors: Makoto Kitamura, Hachioji (JP); Yamato Kanda, Hino (JP); Takashi Kono, Tachikawa (JP); Masashi Hirota, Hachioji (JP); Takehiro Matsuda, Hachioji (JP)

(73) Assignee: Olympus Corporation, Tokyo (JP)

( * ) Notice: Subject to any disclaimer, the term of this patent is extended or adjusted under 35 U.S.C. 154(b) by 241 days.

(21) Appl. No.: 13/104,363

(22) Filed: May 10, 2011

(65) Prior Publication Data

US 2011/0280443 A1 Nov. 17, 2011

(30) Foreign Application Priority Data

May 14, 2010 (JP) .................................. 2010-112541

(51) Int. Cl.
*G06K 9/00* (2006.01)
(52) U.S. Cl.
USPC .......................................... 382/128; 382/103
(58) Field of Classification Search
USPC ............................ 382/103, 128; 600/109, 117
See application file for complete search history.

(56) References Cited

U.S. PATENT DOCUMENTS

2006/0069317 A1 3/2006 Horn et al.

FOREIGN PATENT DOCUMENTS

| EP | 2 052 674 A1 | 4/2009 |
| EP | 2 149 326 A1 | 2/2010 |
| JP | 2002-165757 | 6/2002 |
| WO | WO 2009/025780 A1 | 2/2009 |

OTHER PUBLICATIONS

European Search Report dated Nov. 21, 2011 from corresponding European Patent Application No. EP 11 00 3623.3.

*Primary Examiner* — Duy M Dang
(74) *Attorney, Agent, or Firm* — Scully, Scott, Murphy & Presser, P.C.

(57) ABSTRACT

An image processing apparatus includes an identification criterion creating unit that creates an identification criterion so as to enable identification of specific regions in a target image to be processed that is selected in chronological order from among images constituting a set of time-series images; includes a feature data calculating unit that calculates the feature data of each segmented region in the target image to be processed; and includes a specific region identifying unit that, based on the feature data of each segmented region, identifies the specific regions in the target image to be processed by using the identification criterion. Moreover, the identification criterion creating unit creates the identification criterion based on the pieces of feature data of the specific regions identified in the images that have been already processed.

25 Claims, 24 Drawing Sheets

IMAGE PROCESSING APPARATUS, IMAGE PROCESSING METHOD, AND COMPUTER-READABLE RECORDING MEDIUM

CROSS-REFERENCE TO RELATED APPLICATION

This application is based upon and claims the benefit of priority from Japanese Patent Application No. 2010-112541, filed on May 14, 2010, the entire contents of which are incorporated herein by reference.

BACKGROUND OF THE INVENTION

1. Field of the Invention

The present invention relates to an image processing apparatus, an image processing method, and a computer-readable recording medium for processing a set of time-series images of an image-capturing target that are captured in chronological order.

2. Description of the Related Art

A diagnosis support apparatus is known that identifies lesion regions from images, which are captured inside the body of a subject using an endoscopic device, and then displays the lesion regions on a display unit (see Japanese Laid-open Patent Publication No. 2002-165757). In this conventional technology, teacher data is prepared in advance with the aim of using it as the criterion for identifying the lesion regions. Then, on the basis of the teacher data, the lesion regions are identified by classifying a feature data such as the color ratio of each pixel.

SUMMARY OF THE INVENTION

An image processing apparatus according to the present invention is for processing a set of time-series images of an image-capturing target that are captured in chronological order. The image processing apparatus includes an image selecting unit that selects, in chronological order, a target image to be processed from among images constituting the set of time-series images; an identification criterion creating unit that creates an identification criterion so as to enable identification of a specific region in the target image to be processed; a feature data calculating unit that calculates a feature data for each pixel or for each small region in the target image to be processed; and a specific region identifying unit that, based on the feature data calculated for each pixel or for each small region, identifies a specific region in the target image to be processed by using the identification criterion. The identification criterion creating unit creates the identification criterion based on a feature data of the specific region in such an image that has been already selected as the target image to be processed by the image selecting unit and that has been already subjected to identification by the specific region identifying unit.

An image processing method according to the present invention includes selecting, in chronological order, a target image to be processed from among images constituting a set of time-series images of an image-capturing target that are captured in chronological order; creating an identification criterion so as to enable identification of a specific region in the target image to be processed; calculating feature data for each pixel or for each small region in the target image to be processed; and identifying, based on the feature data calculated for each pixel or for each small region, a specific region in the target image to be processed by using the identification criterion. The creating includes creating the identification criterion based on a feature data of the specific region in such an image that has been already selected as the target image to be processed and that has been already subjected to identification.

A non-transitory computer-readable recording medium according to the present invention has an executable program stored thereon. The program instructs a processor to perform selecting, in chronological order, a target image to be processed from among images constituting a set of time-series images of an image-capturing target that are captured in chronological order; creating an identification criterion so as to enable identification of a specific region in the target image to be processed; calculating feature data for each pixel or for each small region in the target image to be processed; and identifying, based on the feature data calculated for each pixel or for each small region, a specific region in the target image to be processed by using the identification criterion. The creating includes creating the identification criterion based on a feature data of the specific region in such an image that has been already selected as the target image to be processed and that has been already subjected to identification.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments. Besides, in the description with reference to each accompanying drawing, the same constituent elements are referred to by the same reference numbers.

An image processing apparatus according to the following embodiments is configured to process a set of images, captured in chronological order (i.e., time-series images), of an in-vivo lumen such as the alimentary canal using a medical observation instrument such as an endoscope or a capsule endoscope that is introduced in the body of a subject. The following explanation is given for an exemplary case when the regions of normal mucosa (normal mucosa regions) inside the images (hereinafter, referred to as "in-vivo lumen images"), which constitute a set of time-series images, are identified as specific regions. Herein, it is assumed that the in-vivo lumen images that constitute a set of time-series images and that are processed by the image processing apparatus according to the following embodiments are, for example, color images having the pixel value of 256 gradations with respect to each color component of red (R), green (G), and blue (B) in each pixel. Meanwhile, the abovementioned specific regions are not limited to normal mucosa regions, and can be any type of regions that needs to be identified within the in-vivo lumen images. Moreover, the implementation of the present invention is not limited to images capturing an in-vivo lumen as the image-capturing target. That is, it is also possible to implement the present invention to images capturing other image-capturing targets.

First Embodiment

Figure 1:
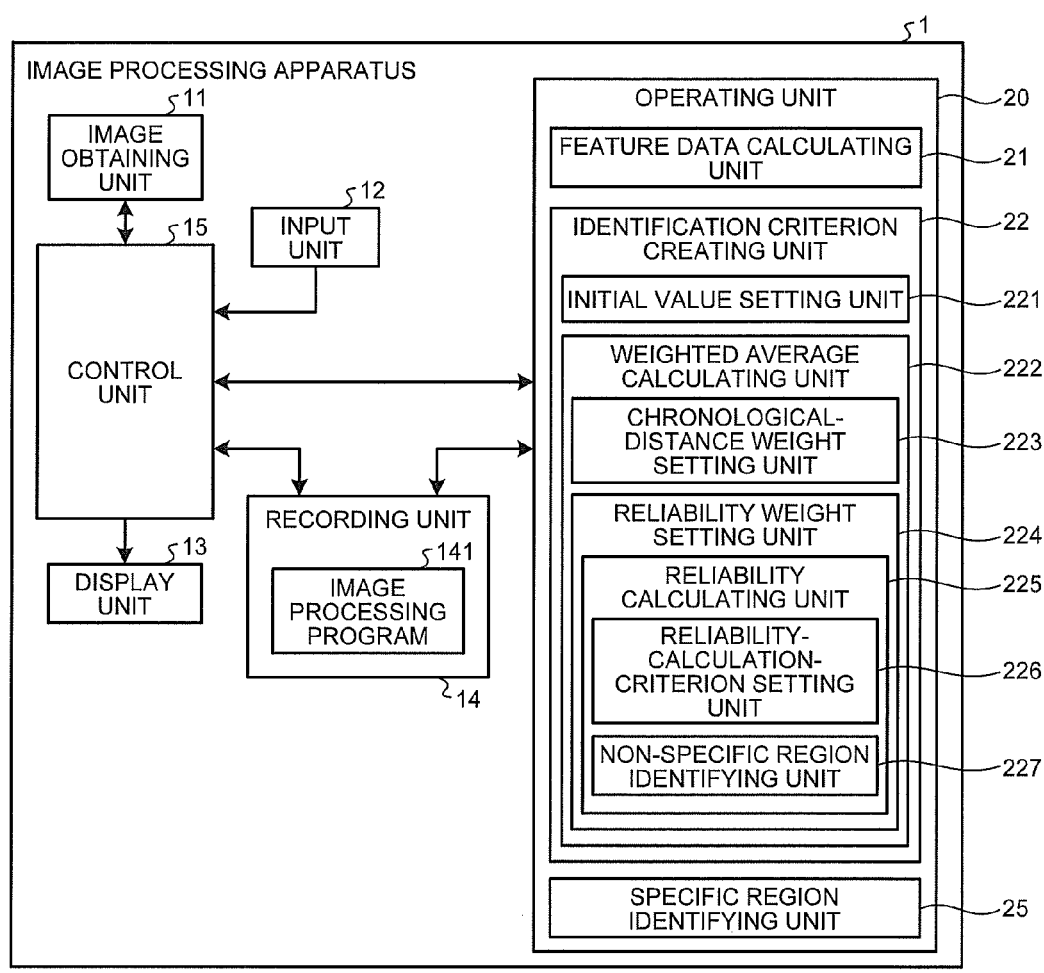
FIG. 1 is an exemplary block diagram of a functional configuration of an image processing apparatus according to a first embodiment of the present invention.

Firstly, explained below is the image processing apparatus according to a first embodiment of the present invention. FIG. 1 is an exemplary block diagram of a functional configuration of an image processing apparatus 1 according to the first embodiment. As illustrated in FIG. 1, the image processing apparatus 1 according to the first embodiment includes an image obtaining unit 11, an input unit 12, a display unit 13, a recording unit 14, an operating unit 20, and a control unit 15. Herein, the control unit 15 controls, in entirety, the operations of the image processing apparatus 1.

The image obtaining unit 11 obtains image data of a set of time-series images captured using a medical observation instrument. The image data of a set of time-series images (more specifically, the image data of all in-vivo lumen images constituting a set of time-series images) obtained by the image obtaining unit 11 is first recorded in the recording unit 14, then processed by the operating unit 20, and then displayed on the display unit 13 as necessary. If, for example, a portable recording medium is used for transferring the image data from the medical observation instrument, then the image obtaining unit 11 can be configured as a reader device to which the portable recording medium can be detachably attached. That enables the reader device to read the image data of a set of time-series images from the recording medium. Alternatively, if a server is installed at a suitable position with the aim of storing therein the image data of a set of time-series images captured by the medical observation instrument; then, in order to obtain the image data from the server, the image obtaining unit 11 can be configured as a communication device connectable to the server so that the image data of the set of time-series images can be obtained by performing data communication with the server via the image obtaining unit 11. Still alternatively, in the case of obtaining the image data from the medical observation instrument via a cable, the image obtaining unit 11 can be configured as an interface device through which the image data is input.

The input unit 12 is put into practice using, for example, a keyboard, a mouse, a touch-sensitive panel, and a variety of switches; and feeds an input signal to the control unit 15. The display unit 13 is put into practice using a display device such as a liquid crystal display (LCD) or an electroluminescent display (ELD) that, under the control of the control unit 15, displays a variety of screens including the in-vivo lumen images.

The recording unit 14 is put into practice using an integrated circuit (IC) memory such as a read only memory (ROM) or a random access memory (RAM) of updatable flash memory type, using an internal hard disk drive (HDD) or a hard disk drive connected to a data communication terminal, or using an information recording medium such as a compact disk read only memory (CD-ROM) and a reading device to read information therefrom. The recording unit 14 is used to store a computer program that, when executed, operates the image processing apparatus 1 and performs a variety of functions provided therein. Besides, the recording unit 14 is used to store, in advance or on a case-by-case basis, the data required during the execution of the computer program. Moreover, the recording unit 14 is used to store the image data of a set of time-series images obtained by the image obtaining unit 11 and to store an image processing program that is executed to identify normal mucosa regions in each in-vivo lumen image constituting the set of time-series images.

The operating unit 20 is put into practice using hardware such as a central processing unit (CPU). The operating unit 20 processes, in chronological order, each in-vivo lumen image constituting the set of time-series images and performs a variety of arithmetic processing for the purpose of identifying normal mucosa regions in each in-vivo lumen image. In the first embodiment, the in-vivo lumen images are processed beginning with the chronologically earliest in-vivo lumen image up to the chronologically latest in-vivo lumen image. That is, the in-vivo lumen images are processed beginning with the initial (first) in-vivo lumen image up to the last (e.g., N-th) in-vivo lumen image. Then, in the first embodiment, regarding the chronologically earliest in-vivo lumen image, the normal mucosa regions are identified by referring to an initial value that is set in advance as the identification criterion. Herein, the initial value of the identification criterion is set in advance and stored in the recording unit 14. Subsequently, by using the pieces of feature data of the normal mucosa regions identified in the in-vivo lumen image that has already been processed, the identification criterion is set adaptively and used for identifying the remaining normal mucosa regions.

The operating unit 20 includes a feature data calculating unit 21, an identification criterion creating unit 22, and a specific region identifying unit 25. The feature data calculating unit 21 segments the target in-vivo lumen image to be processed into, for example, smaller segmented regions; and, as described later, for each segmented region, calculates the average of G/R values and the average of B/G values as the pieces of feature data.

The identification criterion creating unit 22 is a functional unit for setting the identification criterion that is referred to for identifying the normal mucosa regions. Prior to the processing of the chronologically earliest in-vivo lumen image, the identification criterion creating unit 22 sets the identification criterion to the abovementioned initial value. Once the first in-vivo lumen image of the in-vivo lumen images constituting a set of time-series images is processed, the identification criterion creating unit 22 adaptively sets the identification criterion on a case-by-case basis while processing each of the subsequent in-vivo lumen images. Meanwhile, the identification criterion creating unit 22 includes an initial value setting unit 221 and a weighted average calculating unit 222. The initial value setting unit 221 sets the identification criterion to the initial value. The weighted average calculating unit 222 is a functional unit for calculating the weighted average of the pieces of feature data of the normal mucosa regions identified in each in-vivo lumen image that has been processed already. The weighted average calculating unit 222 further includes a chronological-distance weight setting unit 223 and a reliability weight setting unit 224.

With respect to the pieces of feature data of the normal mucosa regions in an in-vivo lumen image that has been processed already, the chronological-distance weight setting unit 223 sets a weight value corresponding to the chronological distance (hereinafter, referred to as "weight value based on chronological distance). Herein, the chronological distance represents the difference in chronological order of the in-vivo lumen image that has been processed already and the chronological order of the target in-vivo lumen image to be processed.

The reliability weight setting unit 224 includes a reliability calculating unit 225 which calculates the degree of reliability of the identification result regarding each segmented region identified as a normal mucosa region in the vivo lumen image being processed (i.e., calculating the degree of reliability regarding the fact that a segmented region is a normal mucosa region). Depending on such degree of reliability, the reliability weight setting unit 224 sets a weight value corresponding to the pieces of feature data of each normal mucosa region under consideration (hereinafter, referred to as "weight value based on degree of reliability"). The reliability calculating unit 225 further includes a reliability-calculation-criterion setting unit 226 and a non-specific region identifying unit 227. The reliability-calculation-criterion setting unit 226 sets a reliability calculation criterion to be used at the time of calculating the degree of reliability. The non-specific region identifying unit 227 determines whether the specific region identifying unit 25 has identified any region as an abnormal mucosa region in the target in-vivo lumen image to be processed.

The specific region identifying unit 25 refers to the pieces of feature data calculated by the feature data calculating unit 21 and, using the identification criterion created by the identification criterion creating unit 22, identifies the normal mucosa regions in an in-vivo lumen image.

The control unit 15 is put into practice using hardware such as a CPU. Based on the image data obtained by the image obtaining unit 11, the input signal that is fed from the input unit 12, and the computer program and the data stored in the recording unit 14; the control unit 15 issues instructions to the constituent elements of the image processing apparatus 1 and performs data transfer as part of controlling, in entirety, the image processing apparatus 1.

Figure 2:
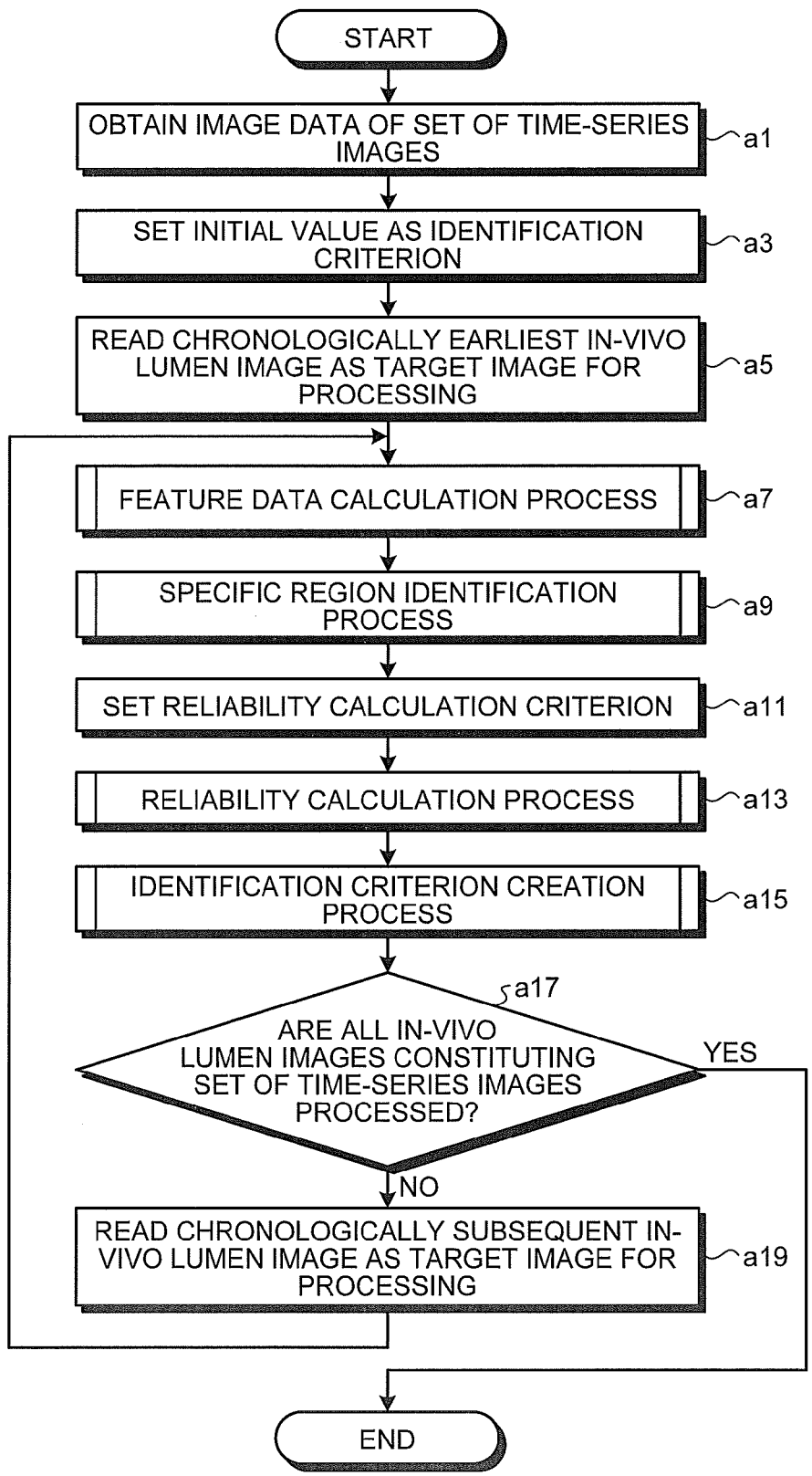
FIG. 2 is an exemplary overall flowchart of the sequence of processes performed by the image processing apparatus according to the first embodiment.

FIG. 2 is an exemplary overall flowchart of the sequence of processes performed by the image processing apparatus 1. The processes explained herein are performed by the constituent elements of the image processing apparatus 1 according to the instructions written in an image processing program 141 that is stored in the recording unit 14.

As illustrated in FIG. 2, firstly, the image obtaining unit 11 obtains the image data of a set of time-series images (Step a1). The image data of each in-vivo lumen image constituting the set of time-series images is stored in the recording unit 14. At that time, along with the image data of each in-vivo lumen image, an image number indicating the chronological order of that in-vivo lumen image is also stored. That makes it possible to read the image data of the in-vivo lumen images having arbitrary image numbers.

Subsequently, the in-vivo lumen images constituting a set of time-series images are sequentially processed in chronological order for the purpose of identifying the normal mucosa regions in each in-vivo lumen image. For that, firstly, in the operating unit 20, the initial value setting unit 221 of the identification criterion creating unit 22 reads the initial value, which is set in advance and stored in the recording unit 14, and sets the initial value as the identification criterion (Step a3). This initial value is used at the time of processing the chronologically earliest in-vivo lumen image that is read for processing at subsequent Step a5. Meanwhile, the initial value is set by, for example, calculating in advance the feature data distribution of the normal mucosa regions.

Explained below is the sequence of calculating the initial value in the form of the feature data distribution of the normal mucosa regions. Prior to the calculation of the initial value, a plurality of in-vivo lumen images capturing the normal mucosa regions are kept ready. Firstly, the in-vivo lumen images capturing the normal mucosa regions are segmented into rectangular blocks of a predetermined size (e.g., 8×8 pixels) that serve as segmented regions.

Subsequently, the feature data for each segmented region is calculated. Herein, the average of G/R values (color ratio between the G component and the R component) of each pixel within each segmented region and the average of B/G values (color ratio between the B component and the G component) of each pixel within the segmented region are calculated as the pieces of feature data of that segmented region. Assume that $R_{sum}$ represents the total value of the values of the R component within a segmented region, $G_{sum}$ represents the total value of the values of the G component within that segmented region, and $B_{sum}$ represents the total value of the values of the B component within that segmented region. In that case, an average GR of G/R values is given below in Equation (1) and an average BG of B/G values is given below in Equation (2)

$$GR=(G_{sum}/R_{sum}) \quad (1)$$

$$BG=(B_{sum}/G_{sum}) \quad (2)$$

Subsequently, the process of calculating the average of G/R values and the average of B/G values within each segment region is performed for each of the plurality of in-vivo lumen images that are kept ready. Then, the frequency distribution of the average of G/R values and the average of B/G values is created in a two-dimensional feature plane. The frequency distribution is normalized in such a way that the total of frequencies is equal to 100 and is set as the feature data distribution of the normal mucosa regions. In this way, the initial value of the identification criterion is created by calculating the feature data distribution of the normal mucosa regions, and is stored in the recording unit 14.

Figure 3:
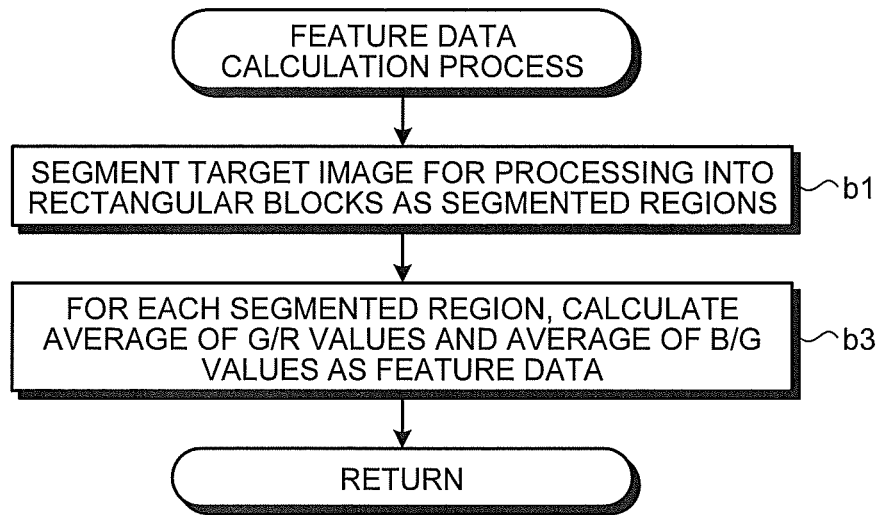
FIG. 3 is an exemplary flowchart for explaining the detailed sequence of a feature data calculation process according to the first embodiment.

Returning to the explanation with reference to FIG. 2, the operating unit 20 reads, as the target in-vivo lumen image to be processed, the chronologically earliest in-vivo lumen image that constitutes a set of time-series images stored in the recording unit 14 at Step a1 (Step a5); and selects that in-vivo lumen image to be processed. Then, the feature data calculating unit 21 performs a feature data calculation process at Step a7. FIG. 3 is an exemplary flowchart for explaining the detailed sequence of the feature data calculation process.

In the feature data calculation process, firstly, the feature data calculating unit 21 segments the target in-vivo lumen image to be processed into rectangular blocks of 8×8 pixels as segmented regions (Step b1). Besides, at that time, in order to enable identification of the segment region to which each pixel in the target in-vivo lumen image to be processed belongs, the feature data calculating unit 21 associates the segmented regions with the pixel positions in the in-vivo lumen image. More particularly, to each segmented region, the feature data calculating unit 21 assigns a unique region number such as a serial number; and creates a region number image in which the pixel value of each pixel is the region number of the segmented region to which that pixel belongs.

Subsequently, for each segmented region, the feature data calculating unit 21 calculates the average of G/R values and the average of B/G values as the pieces of feature data (Step b3). More particularly, for each segmented region, the feature data calculating unit 21 calculates the average of G/R values in each pixel within the segmented region according to Equation (1) and calculates the average of B/G values in each pixel within the segmented region according to Equation (2). The pieces of feature data in the form of the average of G/R values and the average of B/G values in each segmented region of the target in-vivo lumen image to be processed are then stored in the recording unit 14 in a corresponding manner with the image number of that image. Then, the system control returns to Step a7 illustrated in FIG. 2 and proceeds to Step a9.

Figure 4:
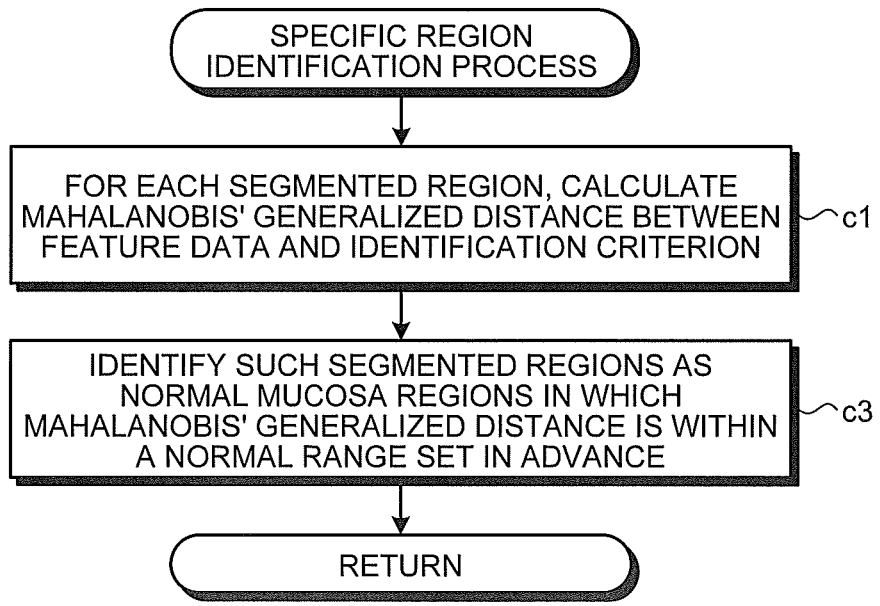
FIG. 4 is an exemplary flowchart for explaining the detailed sequence of a specific region identification process according to the first embodiment.

Subsequently, the specific region identifying unit 25 performs a specific region identification process at Step a9. FIG. 4 is an exemplary flowchart for explaining the detailed sequence of the specific region identification process. In the specific region identification process, for each segmented region in the target in-vivo lumen image to be processed, the specific region identifying unit 25 identifies the normal mucosa regions based on the pieces of feature data calculated for that segmented region at Step a7 illustrated in FIG. 2. At that time, the specific region identifying unit 25 makes use of the identification criterion created for the purpose of identifying the normal mucosa regions in the target in-vivo lumen image to be processed. That is, the specific region identifying unit 25 makes use of the latest identification criterion at that point of time. In the first embodiment, the identification criterion is the frequency distribution in a two-dimensional feature plane of the pieces of feature data (the average of G/R values and the average of B/G values). When the chronologically earliest in-vivo lumen image is the target in-vivo lumen image to be processed, the initial value set at Step a3 illustrated in FIG. 2 happens to be the latest identification criterion at the point of time. When an in-vivo lumen image after the second in-vivo lumen image in chronological order is the target in-vivo lumen image to be processed, the latest initial value updated at Step a11 described later with reference to FIG. 6 happens to be the latest identification criterion at the point of time. More particularly, based on the comparison between the pieces of feature data of each segmented region and the identification criterion, it is determined whether or not each segmented region is a normal mucosa region.

For example, in the first embodiment, with respect to each segmented region, the normal mucosa regions are identified by calculating the Mahalanobis' generalized distance (see CG-ARTS Society, digital image processing, P222-P223) between the pieces of feature data of that segmented region and the identification criterion. That is, as illustrated in FIG. 4, for each segmented region, the specific region identifying unit 25 firstly calculates the pieces of feature data in the form of the average of G/R values and the average of B/G values, and then calculates the Mahalanobis' generalized distance between the pieces of feature data and the latest identified criterion at that point of time (Step c1). Subsequently, regarding such segmented regions in which the calculated Mahalanobis' generalized distance is within a normal range set in advance, the specific region identifying unit 25 identifies those regions as the normal mucosa regions (Step c3). On the other hand, regarding the segmented regions in which the calculated Mahalanobis' generalized distance is outside the normal range, the specific region identifying unit 25 those regions as the abnormal mucosa regions. Herein, the predetermined normal range can be either a fixed value or a value set changeably by the user process. Subsequently, the identification result regarding the normal mucosa regions identified in the target in-vivo lumen image to be processed (i.e., the identification result regarding whether each segmented region is a normal mucosa region or an abnormal mucosa region) is stored in the recording unit 14. Then, the system control returns to Step a9 illustrated in FIG. 2 and proceeds to Step a11.

At Step a11, subsequently, the reliability-calculation-criterion setting unit 226 of the reliability calculating unit 225 sets a reliability calculation criterion to be used in a reliability calculation process performed at Step a13). For example, when there exist the segmented regions that are identified as the abnormal mucosa regions at Step c3 illustrated in FIG. 4, the reliability-calculation-criterion setting unit 226 calculates the frequency distribution in a two-dimensional feature plane of the pieces of feature data, which is the average of G/R values and the average of B/G values, of those segmented regions which are identified as abnormal mucosa regions, and sets the frequency distribution as the reliability calculation criterion. Then, the reliability calculation criterion is stored in the recording unit 14.

Meanwhile, the sequence of setting the reliability calculation criterion is not limited to the abovementioned explanation. For example, as a first modification example, the reliability calculation criterion can also be set to be the latest identification criterion at that point of time, that is, the identification criterion used for the purpose of identifying the normal mucosa regions in the target in-vivo lumen image to be processed.

As a second modification example, prior to the setting of the reliability calculation criterion, in-vivo lumen images capturing the normal mucosa regions as well as in-vivo lumen images capturing the abnormal mucosa regions are kept ready. Then, firstly, the in-vivo lumen images capturing the normal mucosa regions are segmented into segmented regions and, for each segmented region, the average of G/R values and the average of B/G values are calculated as the pieces of feature data of the normal mucosa regions. In an identical manner, the in-vivo lumen images capturing the abnormal mucosa regions are segmented into segmented regions and, for each segmented region, the average of G/R values and the average of B/G values are calculated as the pieces of feature data of the abnormal mucosa regions. Then, by referring to the pieces of feature data of the normal mucosa regions and the pieces of feature data of the abnormal mucosa regions, a feature data range for the normal mucosa regions is determined and is set as the reliability calculation criterion. Meanwhile, in this case, since the reliability calculation criterion can be set in advance and stored in the recording unit 14, reading of the reliability calculation criterion can be performed at Step a11.

Figure 5:
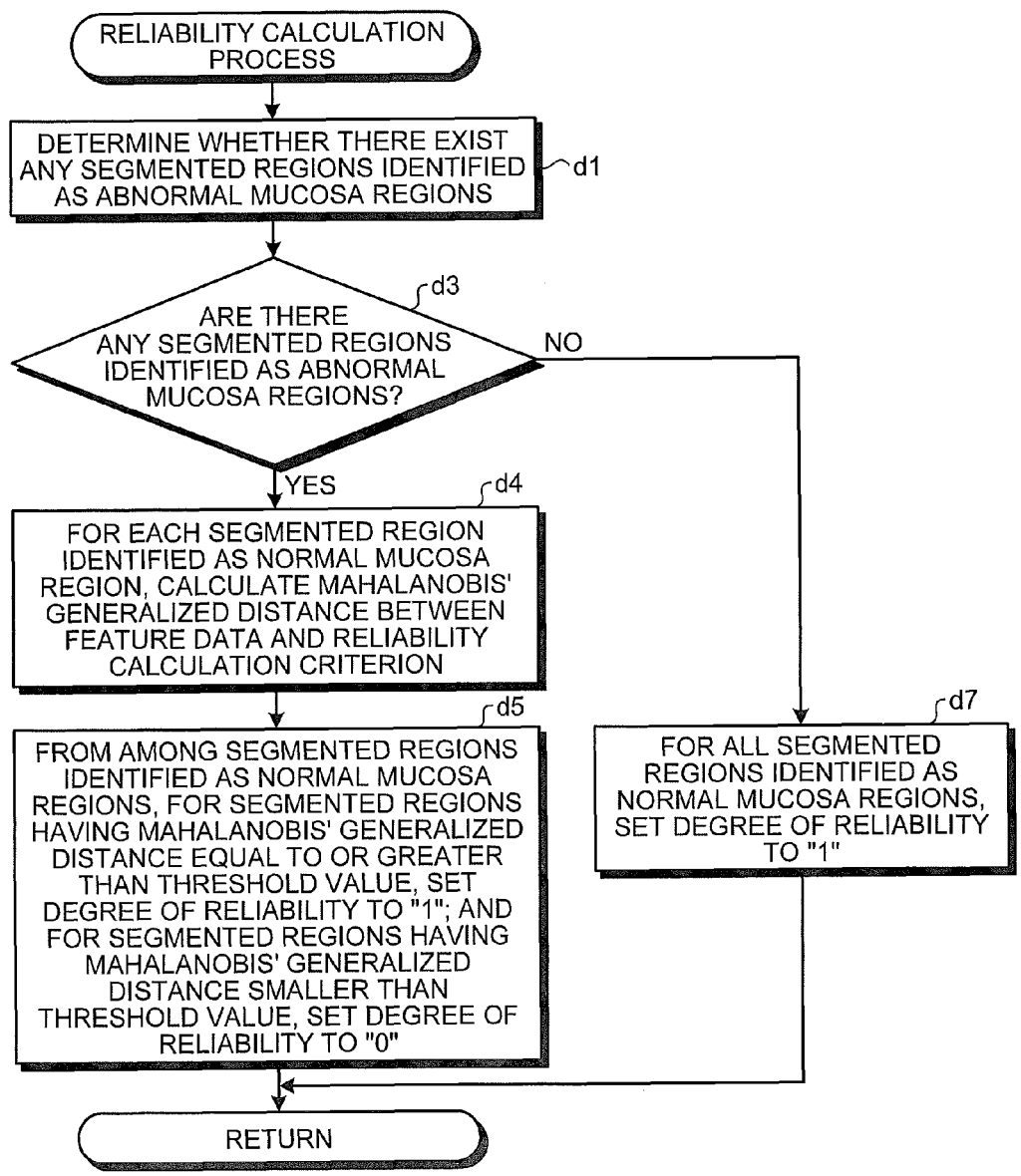
FIG. 5 is an exemplary flowchart for explaining the detailed sequence of a reliability calculation process according to the first embodiment.

Upon setting the reliability calculation criterion as described above, the reliability calculating unit 225 performs the reliability calculation process for calculating the degree of reliability regarding each segmented region that is identified as a normal mucosa region in the target in-vivo lumen image to be processed (Step a13). FIG. 5 is an exemplary flowchart for explaining the detailed sequence of the reliability calculation process. In the reliability calculation process, the degree of reliability is calculated with respect to the identification result regarding normal mucosa regions/abnormal mucosa regions obtained for each segmented region at Step c3 illustrated in FIG. 4.

In the reliability calculation process, firstly, the non-specific region identifying unit 227 determines whether there exist any segmented regions identified as abnormal mucosa regions at Step c3 illustrated in FIG. 4 (Step d1). If there exist any segmented regions identified as abnormal mucosa regions (Yes at Step d3), then the reliability calculating unit 225 calculates, for each segmented region, the degree of reliability of the normal mucosa regions. That is, the reliability calculating unit 225 firstly sequentially processes those segmented regions which are identified as normal mucosa regions and then calculates the Mahalanobis' generalized distance between the pieces of feature data of each segmented region and the reliability calculation criterion set at Step a11 illustrated in FIG. 2 (i.e., the frequency distribution of the pieces of feature data of each segmented region identified as an abnormal mucosa region in the target in-vivo lumen image to be processed) (Step d4). Subsequently, from among the segmented regions identified as the normal mucosa regions, for the segmented regions having the Mahalanobis' generalized distance equal to or greater than a threshold value set in advance, the reliability calculating unit 225 sets the degree of reliability to "1"; and for the segmented regions having the Mahalanobis' generalized distance smaller than the threshold value set in advance, the reliability calculating unit 225 sets the degree of reliability to "0" (Step d5). Such values of the degree of reliability set for the segmented regions identified as the normal mucosa regions are stored in the recording unit 14. Meanwhile, the threshold value can be either a fixed value or a value set changeably by the user operation.

Herein, as described above, the reliability calculation criterion represents the frequency distribution of the pieces of feature data of the abnormal mucosa regions in the target in-vivo lumen image to be processed. Thus, by making use of the Mahalanobis' generalized distance calculated at Step d4, it becomes possible to determine the intermediate regions between the normal mucosa regions and the regions other than the normal mucosa regions, such as the abnormal mucosa regions. Then, from among the segmented regions identified as normal mucosa regions, a low degree of reliability is calculated for the regions determined to be intermediate regions in the abovementioned manner. Subsequently, the system control returns to Step a13 illustrated in FIG. 2 and proceeds to Step a15.

Meanwhile, if there are no segmented regions identified as abnormal mucosa regions (No at Step d3), then the reliability calculating unit 225 sets the degree of reliability of all segmented regions identified as the normal mucosa regions to "1" (Step d7). Such values of the degree of reliability are stored in the recording unit 14. Subsequently, the system control returns to Step a13 illustrated in FIG. 2 and proceeds to Step a15.

Meanwhile, the sequence of calculating the degree of reliability is not limited to the explanation given above. For example, consider a first modification example of the sequence of setting the reliability calculation criterion. As described above, if the identification criterion used to identify the normal mucosa regions in an target in-vivo lumen image to be processed is set as the reliability calculation criterion, then the reliability calculating unit 225 sequentially processes those segmented regions which are identified as normal mucosa regions and then calculates the Mahalanobis' generalized distance between the pieces of feature data of each segmented region and the reliability calculation criterion, which represents the identification criterion used to identify the normal mucosa regions in the target in-vivo lumen image to be processed. Then, from among the segmented regions identified as the normal mucosa regions, for the segmented regions having the Mahalanobis' generalized distance equal to or greater than a threshold value set in advance, the reliability calculating unit 225 sets the degree of reliability to "0"; and for the segmented regions having the Mahalanobis' generalized distance smaller than the threshold value set in advance, the reliability calculating unit 225 sets the degree of reliability to "1". As a result, in this first modification example too, it is possible to determine the intermediate regions between the normal mucosa regions and the regions other than the normal mucosa regions. Then, a low degree of reliability is calculated for the regions determined to be intermediate regions.

Consider a second modification example of the sequence of setting the reliability calculation criterion. As described above, if the frequency amount range for normal mucosa regions is set as the reliability calculation criterion; then, from among the segmented regions identified as the normal mucosa regions, the reliability calculating unit 225 sets the degree of reliability to "1" for those segmented regions which have the pieces of feature data within the frequency amount range for normal mucosa regions, which is set as the reliability calculation criterion. On the other hand, for those segmented regions which have the pieces of feature data outside the frequency amount range for normal mucosa regions, the reliability calculating unit 225 sets the degree of reliability to "0". In this case too, it is possible to determine the intermediate regions between the normal mucosa regions and the regions other than the normal mucosa regions. Then, a low degree of reliability is calculated for the regions determined to be intermediate regions.

Meanwhile, at Step a11 illustrated in FIG. 2, it is also possible to set three reliability calculation criteria: the frequency distribution of the pieces of feature data of abnormal mucosa regions in the target in-vivo lumen image to be processed, the identification criterion to be used for the purpose of identifying the normal mucosa regions in the target in-vivo lumen image to be processed, and the feature data range for the normal mucosa regions. Subsequently, during the reliability calculation process, the degree of reliability is calculated using each of the three reliability calculation criteria and a final degree of reliability can be obtained from the three degrees of reliability. More particularly, a degree of reliability T1 is calculated when the reliability calculation criteria is considered to be the frequency distribution of the pieces of feature data of abnormal mucosa regions in the target in-vivo lumen image to be processed; a degree of reliability T2 is calculated when the reliability calculation criteria is considered to be the identification criterion to be used for the purpose of identifying the normal mucosa regions in the target in-vivo lumen image to be processed; and a degree of reliability T3 is calculated when the reliability calculation criteria is considered to be the feature data range for the normal mucosa regions. Then, based on the values of the identification criteria T1, T2, and T3; a final degree of reliability T can be calculated using Equation (3) given below.

$$T=(T1+T2+T3)/3 \quad (3)$$

Figure 6:
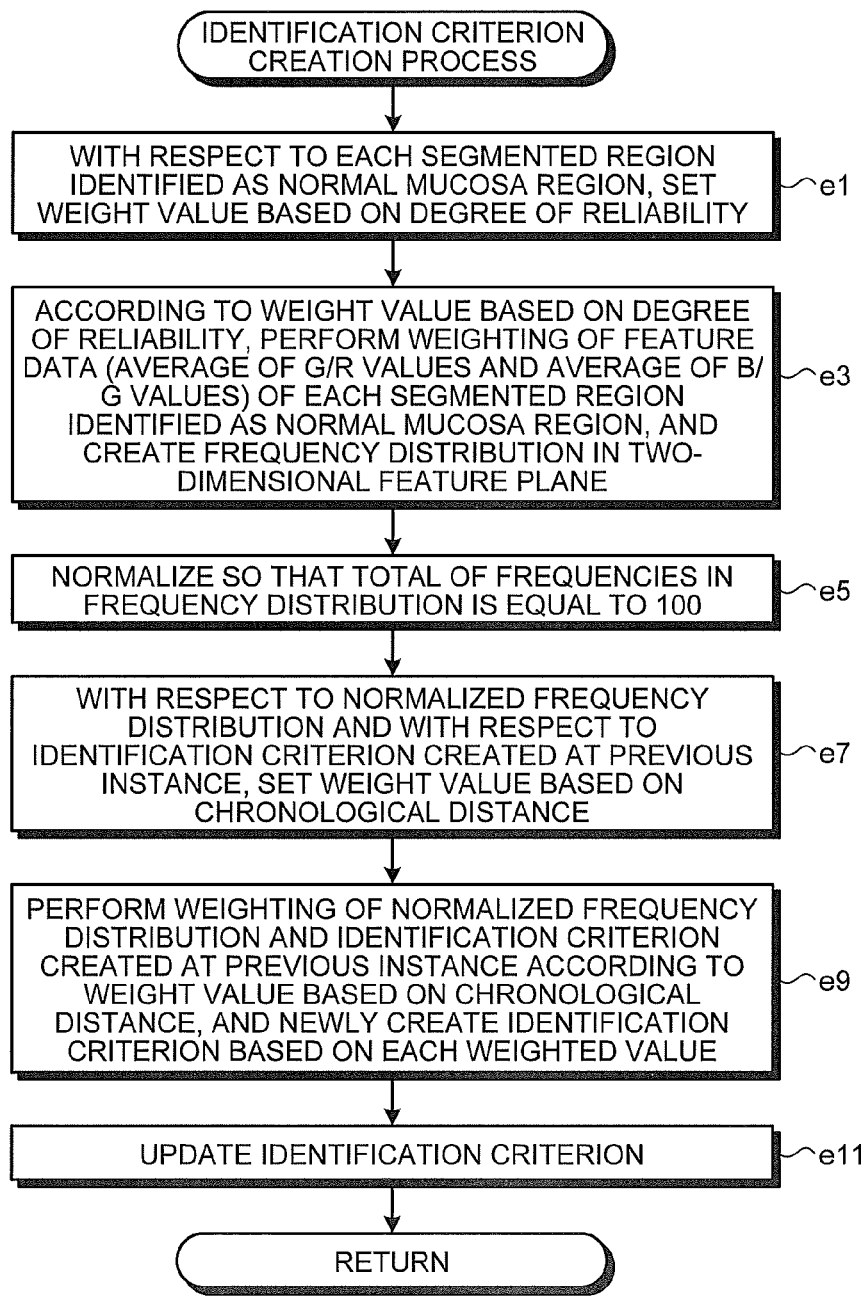
FIG. 6 is an exemplary flowchart for explaining the detailed sequence of an identification criterion creation process according to the first embodiment.

Subsequently, the identification criterion creating unit 22 performs an identification criterion creation process (Step a15). FIG. 6 is an exemplary flowchart for explaining the detailed sequence of the identification criterion creation process.

In the identification criterion creation process, with respect to each segmented region identified as the normal mucosa region, the reliability weight setting unit 224 sets the weight value based on degree of reliability (Step e1). Subsequently, the weighted average calculating unit 222 multiplies the weight value, which is set at Step e1 according to the degree of reliability of each segmented region, with the average of G/R values and the average of B/G values that are the pieces of feature data of that segmented region. With that, the weighted average calculating unit 222 performs reliability-based weighting of the pieces of feature data of each segmented region identified as the normal mucosa region. Then, the weighted average calculating unit 222 creates the frequency distribution in a two-dimensional feature plane of the average of G/R values and the average of B/G values of each segmented region that has been weighted (Step e3), and then normalizes the frequency distribution in such a way that the total of frequencies is equal to 100 (Step e5).

In the first embodiment, for example, the value of the degree of reliability is set as the weight value based on degree of reliability. Hence, from among the segmented regions identified as normal mucosa regions, "1" is multiplied to the pieces of feature data of those segmented regions which have the degree of reliability set to "1" at Step d5 or Step d7 illustrated in FIG. 5. In that case, at Step e3, the frequency distribution is obtained under the assumption that the number of such segmented regions is 1.0. On the other hand, "0" is multiplied to the pieces of feature data of those segmented regions which have the degree of reliability set to "0" at Step d5 illustrated in FIG. 5. In that case, at Step e3, the pieces of feature data of the intermediate regions, which are the segmented regions between the normal mucosa regions and the regions other than the normal mucosa regions, are not included in the frequency distribution.

Consider a modification example of the reliability calculation process performed at Step a13 illustrated in FIG. 2. As described above, a plurality of types of reliability calculation criteria are set and the final degree of reliability T is calculated as the average of the various degrees of reliability (e.g., T1, T2, and T3) calculated according to different reliability calculating criteria. In such a case, the final degree of reliability T is obtained as a value between "0" and "1". For example, "0.5" is multiplied to the pieces of feature data of a segmented region having the degree of reliability of "0.5". Then, at Step e3 illustrated in FIG. 6, the frequency distribution is obtained under the assumption that the number of such segmented regions is 0.5. Thus, since the frequency distribution is created with a small weight that is equivalent to the pieces of feature data of the segmented regions having low reliability, the low-reliability regions between the normal mucosa regions and the regions other than the normal mucosa regions are hardly included in the frequency distribution. Meanwhile, the reliability-based weight values are not limited to the values of the degrees of reliability. Instead, the reliability-based weight values can be another values calculated secondarily from the values of the degrees of reliability.

Subsequently, with respect to the frequency distribution normalized at Step e5 and with respect to the latest identification criterion at that point of time that is created at the previous instance at Step e11, the chronological-distance weight setting unit 223 sets the weight value based on chronological distance (Step e7). Then, the weighted average calculating unit 222 performs weighting by multiplying the frequency distribution normalized at Step e5 and the weight values based on chronological distance that are set to the identification criterion created at the previous instance at Step e7, and creates a new identification criterion by combining the weighted values (Step e9). The weighted average calculating unit 222 then updates the identification criterion stored in the recording unit 14 with the newly-created identification criterion.

For example, at Step e7 and Step e9, a process is performed to create a new identification criterion $S_{new}(GR, BG)$ using Equation (4) given below.

$$S_{new}(GR,BG)=S(GR,BG) \times k1 + H(GR,BG) \times (1-k1) \quad (4)$$

In Equation (4), H(GR, BG) represents the frequency distribution normalized at Step e5, that is, represents the frequency distribution that is created after the pieces of feature data (i.e., the average of G/R values and the average of B/G values) of each segmented region, which is identified as a normal mucosa region in the target in-vivo lumen image to be processed, are weighted according to the degree of reliability of that segmented region. Moreover, S(GR, BG) represents the identification criterion created at the previous instance, that is, represents that identified criterion which is used to identify the normal mucosa regions in the target in-vivo lumen image to be processed.

Herein, since S(GR, BG) is created at the previous instance according to Equation (4), it gets determined on the basis of the pieces of feature data of each segmented region identified as the normal mucosa region in the in-vivo lumen images that have already been processed. In contrast, H(GR, BG) gets determined on the basis of the pieces of feature data of the normal mucosa regions in the target in-vivo lumen image to be processed. Thus, the identification criterion is determined not only on the basis of the pieces of feature data of the normal mucosa regions in the in-vivo lumen images that have already processed but also on the basis of the pieces of feature data of the normal mucosa regions in the target in-vivo lumen image to be processed. Moreover, at that time, the values of H(GR, BG) and S(GR, BG) are weighted with the value of an update coefficient k1.

Herein, k1 represents the update coefficient of the identification criterion, and the value of k1 multiplied to S(GR, BG) and the value of 1−k1 multiplied to H(GR, BG) are equivalent to the weight values based on chronological distance. For example, the update coefficient k1 is set to an appropriate value within the range of 0.0<k1<1.0. Hence, smaller the value of the update coefficient k1, greater is the reflection of the identification result regarding the normal mucosa regions in the target in-vivo lumen image to be processed. Meanwhile, as far as the identification results regarding the normal mucosa regions in the in-vivo lumen images that have been processed are concerned, the identification result obtained at a shorter chronological distance from the target in-vivo lumen image to be processed is reflected to a greater extent than the identification result obtained at a long chronological distance.

As described above, while compiling the pieces of feature data of the normal mucosa regions in the in-vivo lumen images that have already been processed, the identification criterion is adaptively created using the pieces of feature data of the normal mucosa regions in the target in-vivo lumen image to be processed. At that time, the pieces of feature data of the normal mucosa regions in the target in-vivo lumen image to be processed are weighted according to the degrees of reliability, and the weighted pieces of feature data of the normal mucosa regions in the target in-vivo lumen image to be processed as well as the pieces of feature data of the normal mucosa regions in the in-vivo lumen images that have already been processed are weighted according to the chronological distances.

Subsequently, the operating unit 20 checks whether there is any in-vivo lumen image yet to be processed. If any in-vivo lumen image is yet to be processed, that is, if not all of the in-vivo lumen images constituting the set of time-series images have been subjected to the processes from Step a7 to Step a15 (No at Step a17); then the operating unit reads, from the recording unit 14, that in-vivo lumen image which immediately follows the in-vivo lumen image that has been recently processed in chronological order (Step a19); and selects that in-vivo lumen image to be processed. Then, the system control returns to Step a7 so that the processes from Step a7 to Step a15 are performed with respect to the newly-selected in-vivo lumen image.

On the other hand, when all of the in-vivo lumen images constituting the set of time-series images have been subjected to the processes from Step a7 to Step a15 (Yes at Step a17); then the processes are terminated.

As described above, in the first embodiment, the average of G/R values and the average of B/G values in each segmented region are calculated as the pieces of feature data of the target in-vivo lumen image to be processed. Then, based on the comparison between the pieces of feature data of each segmented region and the identification criterion, it is determined whether or not each segmented region is a normal mucosa region. Moreover, regarding each segmented region identified as a normal mucosa region in the vivo lumen image being processed, the degree of reliability is calculated. Furthermore, from among the segmented regions identified as normal mucosa regions, the intermediate regions between the normal mucosa regions and the regions other than the normal mucosa regions are assigned with a low degree of reliability. Once the normal mucosa regions in the target in-vivo lumen image to be processed are identified, the identification criterion is created on the basis of the pieces of feature data of the normal mucosa regions of all in-vivo lumen images, including the target in-vivo lumen image to be processed, that have already been processed. More specifically, the identification criterion is created after the pieces of feature data of the normal mucosa regions of all in-vivo lumen images that have already been processed are weighted according to the chronological distances and the degrees of reliability. When the chronologically earliest in-vivo lumen image is the target in-vivo lumen image to be processed, an initial value is set in advance as the identification criterion. When an in-vivo lumen image after the second in-vivo lumen image in chronological order is the target in-vivo lumen image to be processed, such an identification criterion is used that is created on the basis of the pieces of feature data of the normal mucosa regions identified in all in-vivo lumen images that have already been processed.

According to the first embodiment, in the process of processing each in-vivo lumen image constituting a set of time-series images in chronological order beginning with the chronologically earliest in-vivo lumen image, the pieces of feature data of the normal mucosa regions identified in the in-vivo lumen images that have already been processed are put to use; so that the identification criterion to be applied for identifying the normal mucosa regions in the target in-vivo lumen image to be processed can be adaptively created. By using the identification criterion created adaptively as described above, it becomes possible to sequentially identify the normal mucosa regions in each in-vivo lumen image. Thus, in each in-vivo lumen image constituting the set of time-series images captured inside the body of a subject in chronological order, it becomes possible to accurately identify specific regions such as the normal mucosa regions.

In this way, with respect to the in-vivo lumen images from which the normal mucosa regions are extracted; processes are performed with the aim of, for example, extracting abnormal regions such as lesion regions or bleeding regions. Then, such abnormal regions are appropriately displayed on the display unit 13 so as to allow the user, such as a doctor, to view them. More particularly, the in-vivo lumen images are displayed on the display unit 13 in such a way that, for example, the abnormal regions can be distinguished from the other regions. Alternatively, the in-vivo lumen images including the abnormal regions are displayed on the display unit 13 as the images to be diagnosed. At that time, by removing the normal mucosa regions identified as described in the first embodiment, it becomes possible to extract the abnormal regions. That enables achieving a high degree of precision in detecting abnormalities.

Second Embodiment

Figure 7:
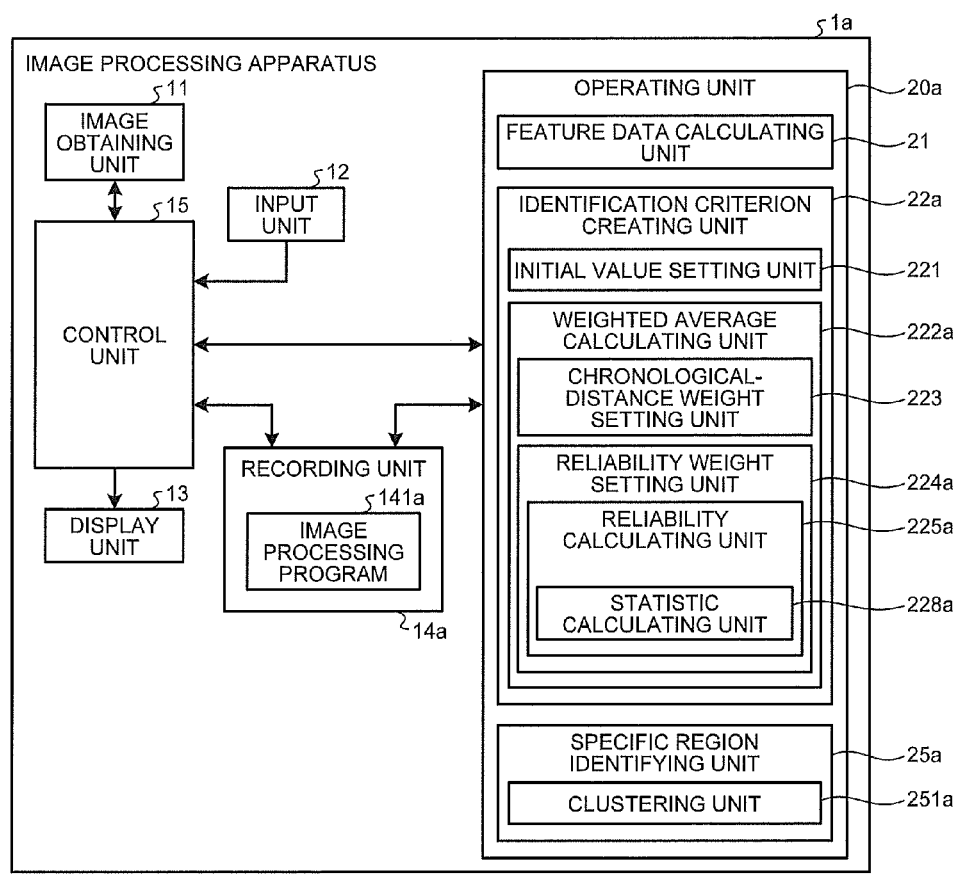
FIG. 7 is an exemplary block diagram of a functional configuration of an image processing apparatus according to a second embodiment of the present invention.

Explained below is an image processing apparatus according a second embodiment of the present invention. FIG. 7 is an exemplary block diagram of a functional configuration of an image processing apparatus 1a according to the second embodiment. Herein, the constituent elements identical to the constituent elements described in the first embodiment are referred to by the same reference numerals. As illustrated in FIG. 7, the image processing apparatus 1a according to the second embodiment includes the image obtaining unit 11, the input unit 12, the display unit 13, a recording unit 14a, an operating unit 20a, and the control unit 15. Herein, the control unit 15 controls, in entirety, the operations of the image processing apparatus 1a.

In the recording unit 14a is stored an image processing program 141a that is executed for identifying normal mucosa regions in each in-vivo lumen image constituting a set of time-series images.

The operating unit 20a includes the feature data calculating unit 21, an identification criterion creating unit 22a, and a specific region identifying unit 25a. The identification criterion creating unit 22a includes the initial value setting unit 221 and a weighted average calculating unit 222a. Besides, the weighted average calculating unit 222a further includes the chronological-distance weight setting unit 223 and a reliability weight setting unit 224a. Moreover, the reliability weight setting unit 224a further includes a reliability calculating unit 225a, which in turn includes a statistic calculating unit 228a which calculates a statistic based on the pieces of feature data of those segmented regions which are identified as normal mucosa regions. Meanwhile, the specific region identifying unit 25a further includes a clustering unit 251a which clusters the frequency distribution of the pieces of feature data of each segmented region.

Figure 8:
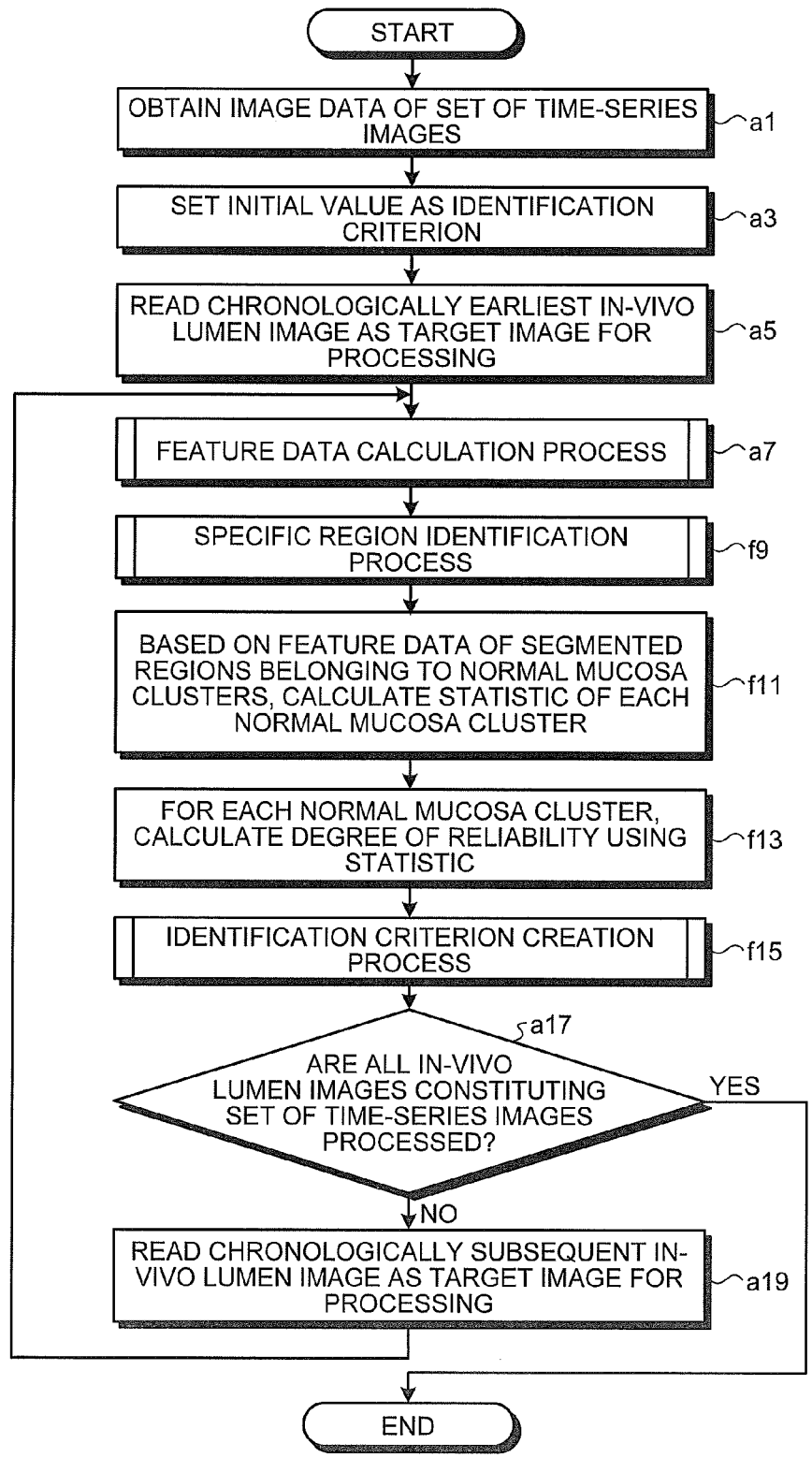
FIG. 8 is an exemplary overall flowchart of the sequence of processes performed by the image processing apparatus according to the second embodiment.

FIG. 8 is an exemplary overall flowchart of the sequence of processes performed by the image processing apparatus 1a. The processes explained herein are performed by the constituent elements of the image processing apparatus 1a according to the instructions written in the image processing program 141a that is stored in the recording unit 14a. Moreover, those steps in FIG. 8 which are identical to the steps described in the first embodiment are referred to by the same step numbers.

Figure 9:
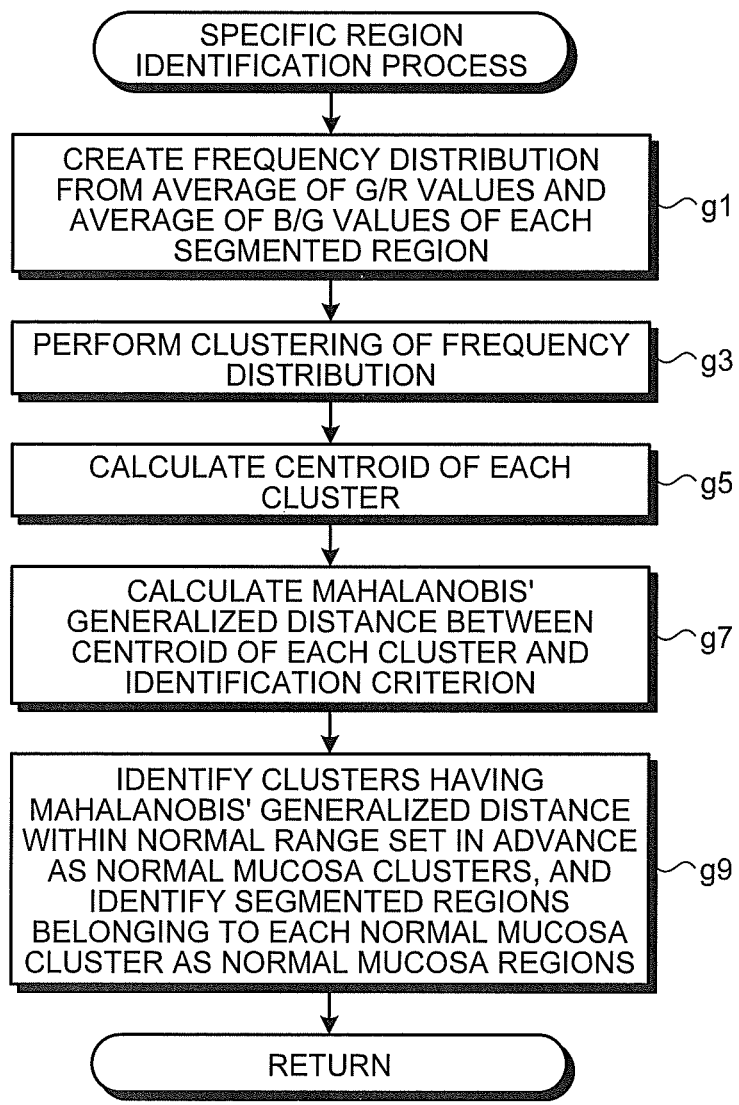
FIG. 9 is an exemplary flowchart for explaining the detailed sequence of the specific region identification process according to the second embodiment.

As illustrated in FIG. 8, in the second embodiment, the feature data calculating unit 21 performs the feature data calculation process and calculates the pieces of feature data of each segmented region in the target in-vivo lumen image to be processed at Step a7. Subsequently, the specific region identifying unit 25a performs the specific region identification process (Step f9). FIG. 9 is an exemplary flowchart for explaining the detailed sequence of the specific region identification process.

In the specific region identification process, firstly, the specific region identifying unit 25a creates the frequency distribution in a two-dimensional feature plane of the pieces of feature data (the average of G/R values and the average of B/G values) of each segmented region calculated at Step a7 illustrated in FIG. 8 (Step g1).

Then, the clustering unit 251a performs clustering of the frequency distribution (Step g3). In the clustering technique, the distribution of data in the feature space is divided into clusters on the basis of the degree of similarity in the data. At that time, in order to enable identification of the segmented regions belonging to each cluster during the following processes, a list is created in which each segmented region is specified in association with the cluster to which it belongs, and that list is stored in the recording unit 14a.

For example, with respect to the data in the two-dimensional feature plane of the pieces of feature data (the average of G/R values and the average of B/G values) of each segmented region, clustering is performed by implementing a known technique such as the K-means method (see CG-ARTS Society, digital image processing, P232). Herein, regarding the sets of data in the two-dimensional feature plane, the distance therebetween corresponds to the degree of similarity. Meanwhile, in the K-means method, it is necessary to specify in advance the number of clusters K. Depending on the specified number of clusters K, the clustering accuracy undergoes significant variation. Hence, in order to obtain a highly accurate clustering result, it is necessary to set an optimum number of clusters K for each image. Herein, as a method of setting the optimum number of clusters K, an algorithm is implemented that determines the optimum number of clusters K based on a cluster count evaluation value (see Chong-Wah Ngo et al, "On Clustering and Retrieval of Video Shots Through Temporal Slices Analysis," Trans Mlt, Vol. 4, No. 4, pp 446-458, 2002). Meanwhile, the clustering technique is not only limited to the K-means method, and it is possible to implement any other clustering technique.

Subsequently, based on the clustering result, the clustering unit 251a calculates the centroid of each cluster (Step g5). Then, for each cluster, the specific region identifying unit 25a calculates the Mahalanobis' generalized distance between the centroid and the latest identification criterion at that point of time (Step g7). Herein, in an identical manner to the first embodiment, the identification criterion is the frequency distribution in the two-dimensional feature plane of the pieces of feature data (the average of G/R values and the average of B/G values). Then, the specific region identifying unit 25a identifies those clusters which have the Mahalanobis' generalized distance within a predetermined normal range as normal mucosa clusters and identifies the segmented regions belonging to the normal mucosa clusters as the normal mucosa regions (Step g9). Here, the segmented regions belonging to those clusters which have the Mahalanobis' generalized distance outside the predetermined normal range are identified as the abnormal mucosa regions. Subsequently, the system controls returns to Step f9 illustrated in FIG. 8 and proceeds to Step f11.

At Step f11, in the reliability calculating unit 225a, for each normal mucosa cluster, the statistic calculating unit 228a calculates a statistic based on the pieces of feature data of the segmented regions belonging to that normal mucosa cluster. For example, for each normal mucosa cluster, the statistic calculating unit 228a calculates a variance value of the pieces of feature data of all segmented regions belonging to that normal mucosa cluster.

Then, the reliability calculating unit 225a makes use of the variance values, which is the statistic calculated at Step f11, for calculating the degree of reliability for each normal mucosa cluster (Step f13). More particularly, from among the normal mucosa clusters, for the normal mucosa clusters having the variance values equal to or greater than a threshold value set in advance, the reliability calculating unit 225a sets the degree of reliability to "0"; and for the normal mucosa clusters having the variance values smaller than the threshold value, the reliability calculating unit 225a sets the degree of reliability to "1". Meanwhile, the threshold value can be either a fixed value or a value set changeably by the user operation. Thus, in the second embodiment, for each normal cluster mucosa, intermediate regions between the normal mucosa regions and the regions other than the normal mucosa regions are identified depending on the magnitude of the corresponding variance value; and the normal mucosa clusters including such intermediate regions are calculated to have a low degree of reliability.

Meanwhile, the sequence of processes for calculating the degree of reliability is not limited to the abovementioned sequence. Alternatively, for example, the Mahalanobis' generalized distance between each normal mucosa cluster and the identification criterion, which is used for the identification of normal mucosa regions in the target in-vivo lumen image to be processed, is calculated. Then, from among the normal mucosa clusters, for the normal mucosa clusters having the Mahalanobis' generalized distance equal to or greater than a threshold value set in advance, the degree of reliability is set to "0"; and for the normal mucosa clusters having the Mahalanobis' generalized distance smaller than the threshold value, the degree of reliability is set to "1". Usually, in the in-vivo lumen images captured in chronological order using a capsule endoscope or the like, the normal mucosa regions account for the majority of regions. Hence, a large majority of the frequency distribution corresponds to the normal mucosa regions. During processes with respect to such regions, such normal mucosa clusters which have similarity with the majority of normal mucosa clusters are calculated to have a high degree of reliability. In contrast, such normal mucosa clusters which do not have similarity with the majority of normal mucosa clusters are considered to be normal mucosa regions to which intermediate regions between the normal mucosa regions and the regions other than the normal mucosa regions belong, and such normal mucosa clusters are calculated to have a low degree of reliability.

Figure 10:
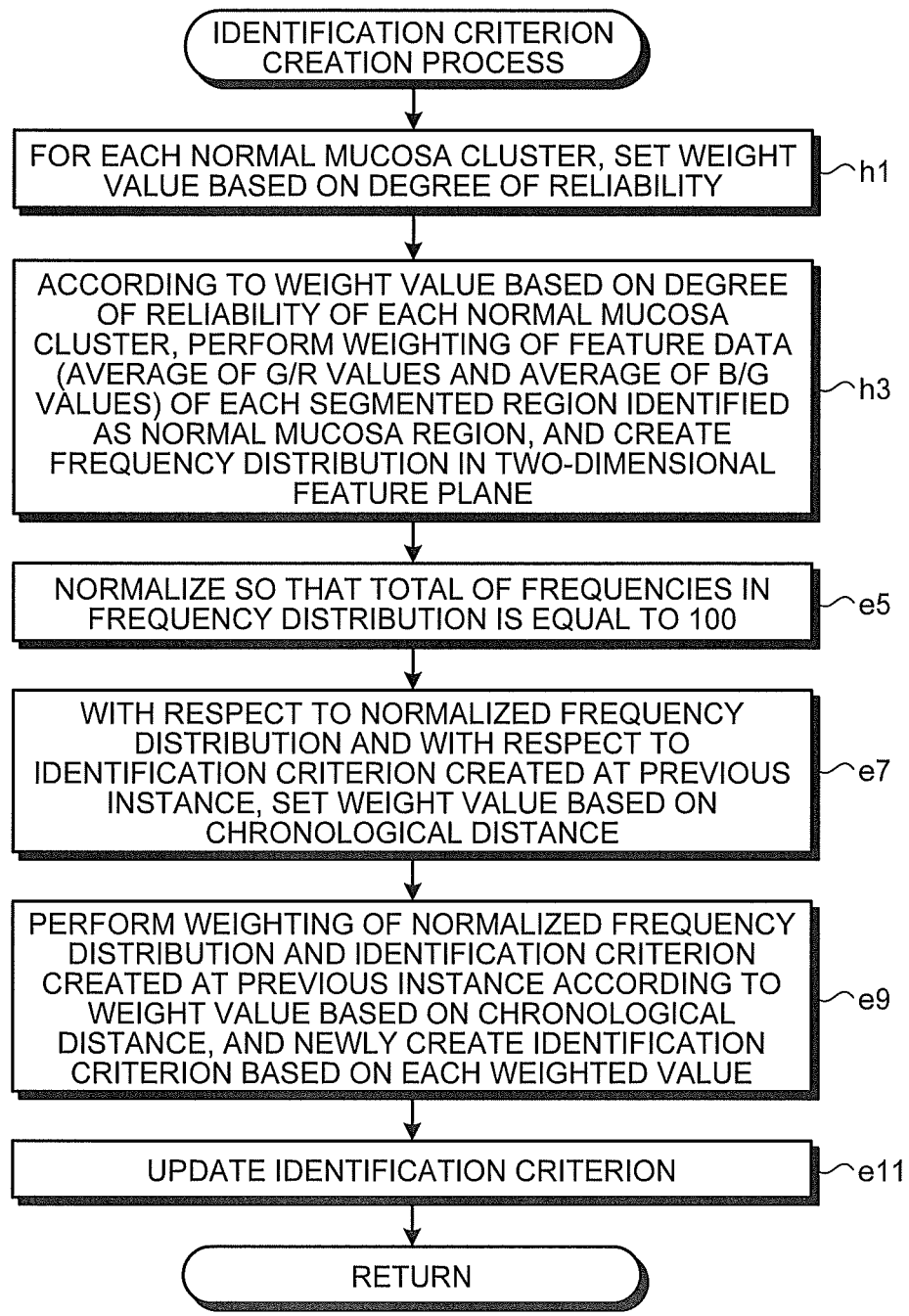
FIG. 10 is an exemplary flowchart for explaining the detailed sequence of the identification criterion creation process according to the second embodiment.

Subsequently, the identification criterion creating unit 22a performs the identification criterion creation process (Step f15). FIG. 10 is an exemplary flowchart for explaining the detailed sequence of the identification criterion creation process. Herein, those steps in FIG. 10 which are identical to the steps described in the first embodiment are referred to by the same step numbers.

In the identification criterion creation process, firstly, the reliability weight setting unit 224a sets a weight value corresponding to each normal mucosa cluster based on the degree of reliability of that normal mucosa cluster (Step h1). Then, the weighted average calculating unit 222a multiplies each weight value, which is set at Step e1 according to the degree of reliability of each normal mucosa cluster, with the average of G/R values and the average of B/G values that are the pieces of feature data of the segmented regions belonging to that normal mucosa cluster, so as to perform reliability-based weighting of the pieces of feature data of each segmented region identified as the normal mucosa region. Moreover, the weighted average calculating unit 222a creates the frequency distribution in a two-dimensional feature plane of the average of G/R values and the average of B/G values of each segmented region that has been weighted (Step h3). Subsequently, the weighted average calculating unit 222a performs the processes from Step e5 to Step e11 in an identical manner to that explained in the first embodiment and updates the identification criterion. Then, the system control returns to f15 illustrated in FIG. 8 and proceeds to Step a17.

As described above, in the second embodiment, the pieces of feature data (the average of G/R values and the average of B/G values) of each segmented region in an in-vivo lumen image are first subjected to clustering, and then the identification of normal mucosa regions is performed with respect to each cluster obtained as the result of clustering. More particularly, the identification of normal mucosa regions is performed by comparing the centroid of each cluster with the identification criterion. Besides, for each cluster identified as a normal mucosa cluster, the variance value of the pieces of feature data is calculated before calculating the degree of reliability; and the degree of reliability is taken into consideration while adaptively creating the identification criterion. Thus, as compared to the first embodiment in which the identification criterion is created/updated after identifying the normal mucosa regions on the basis of segmented regions, the advantage according to the second embodiment is that the identification result can easily follow the variations in the mucosal color.

Third Embodiment

Figure 11:
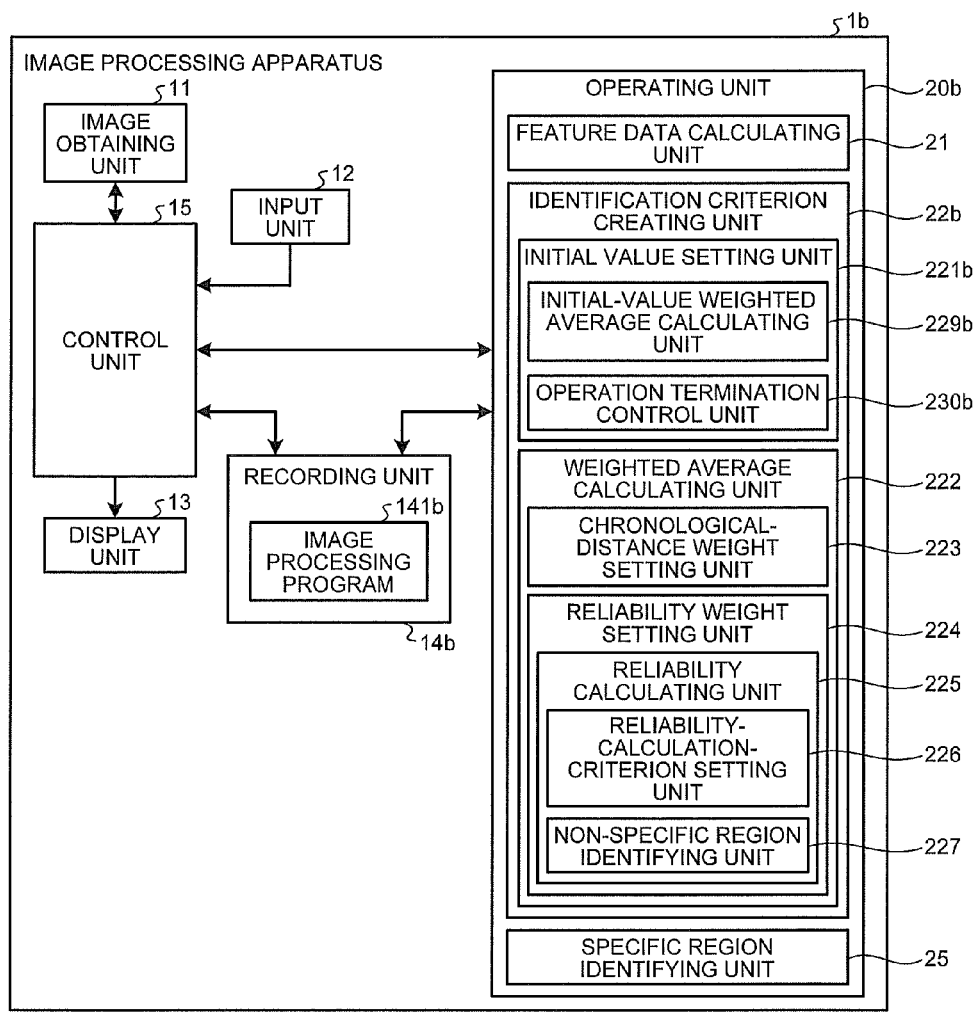
FIG. 11 is an exemplary block diagram of a functional configuration of an image processing apparatus according to a third embodiment of the present invention.

Explained below is an image processing apparatus according to a third embodiment of the present invention. FIG. 11 is an exemplary block diagram of a functional configuration of an image processing apparatus 1b according to the third embodiment. Herein, the constituent elements identical to the constituent elements described in the first embodiment are referred to by the same reference numerals. As illustrated in FIG. 11, the image processing apparatus 1b according to the third embodiment includes the image obtaining unit 11, the input unit 12, the display unit 13, a recording unit 14b, an operating unit 20b, and the control unit 15. Herein, the control unit 15 controls, in entirety, the operations of the image processing apparatus 1b.

In the recording unit 14b is stored an image processing program 141b that is executed for identifying normal mucosa regions in each in-vivo lumen image constituting a set of time-series images.

The operating unit 20b includes the feature data calculating unit 21, an identification criterion creating unit 22b, and the specific region identifying unit 25. The identification criterion creating unit 22b includes an initial value setting unit 221b and the weighted average calculating unit 222. The initial value setting unit 221b sets the initial value of the identification criterion, and further includes an initial-value weighted average calculating unit 229b and an operation termination control unit 230b. With respect to the pieces of feature data of those normal mucosa regions in the in-vivo lumen images which constitute an initial value setting section in which the initial value is to be set; the initial-value weighted average calculating unit 229b sets weights in such a manner that, closer the chronological distance from the last target in-vivo lumen image to be set in the initial value setting section, higher the weight. Then, the initial-value weighted average calculating unit 229b calculates a weighted average. The operation termination control unit 230b controls the termination of the process for calculating the weighted average performed by the initial-value weighted average calculating unit 229b. Meanwhile, the weighted average calculating unit 222 also includes the chronological-distance weight setting unit 223 and the reliability weight setting unit 224. Moreover, the reliability weight setting unit 224 further includes the reliability calculating unit 225, which in turn includes the reliability-calculation-criterion setting unit 226 and the non-specific region identifying unit 227.

In the first embodiment described earlier, the in-vivo lumen images capturing the normal mucosa regions are kept ready and the initial value of the identification criterion is created on the basis of the pieces of feature data of those in-vivo lumen images. As the initial value of the identification criterion, it is desirable to use a value having as little noise as possible so that the normal mucosa regions can be identified with accuracy. However, in case the in-vivo lumen images capturing the normal mucosa regions also include abnormal mucosa regions by mistake, the pieces of feature data happen to include the pieces of feature data of the abnormal mucosa regions. Such pieces of feature data of the abnormal mucosa regions serve as noise thereby causing reduction in the accuracy of the initial value that is created. Meanwhile, as described above, in the in-vivo lumen images captured in chronological order using a capsule endoscope or the like, the normal mucosa regions account for the majority of regions. Hence, as compared to the normal mucosa regions, the abnormal mucosa regions serving as noise are overwhelmingly small in number. Therefore, by creating/updating the identification criterion in repeating fashion by means of processing a large number of in-vivo lumen images and then by using that identification criterion as the initial value, it becomes possible to further reduce the effect of noise.

Figure 12:
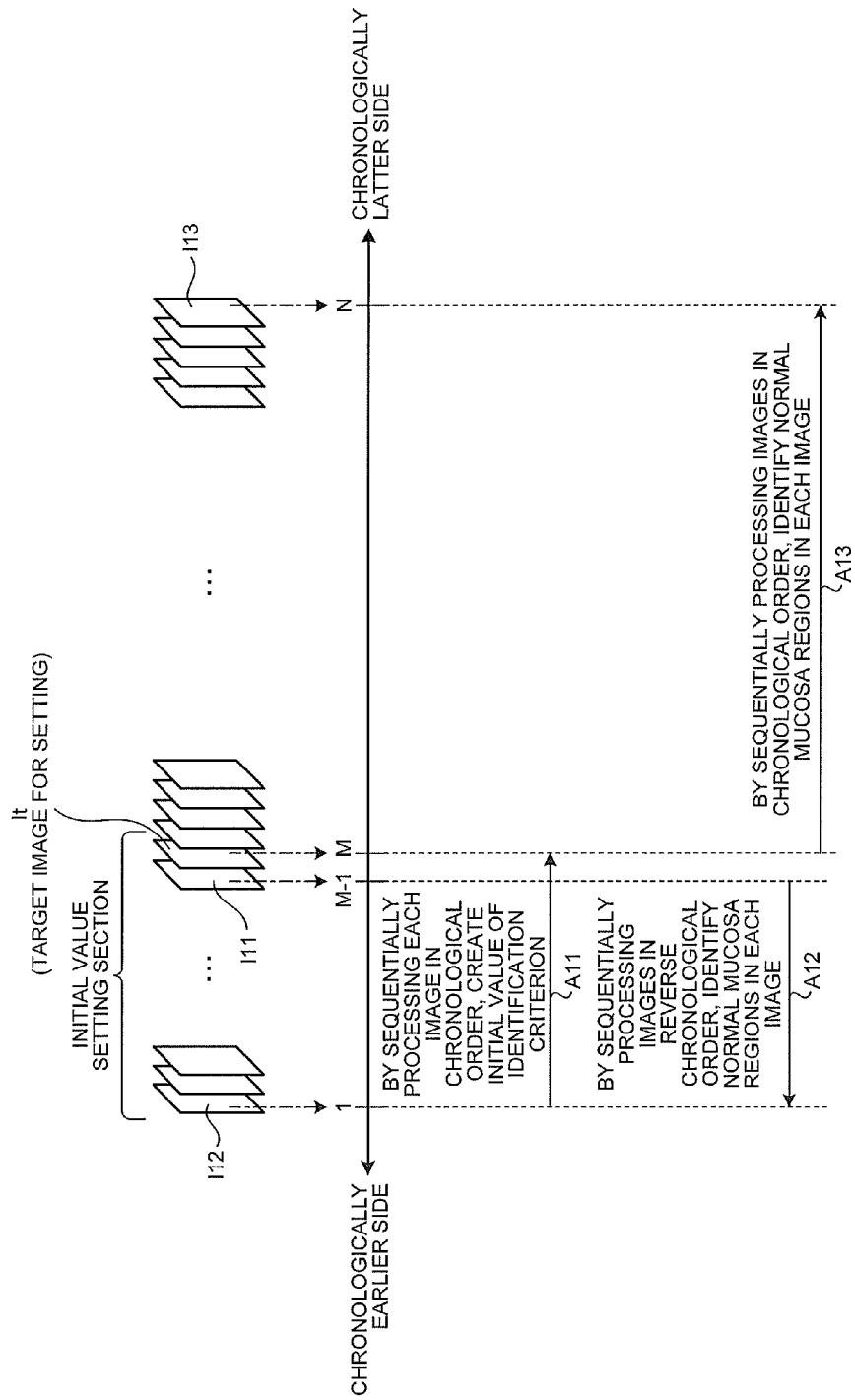
FIG. 12 is an explanatory diagram for explaining an outline of the processes performed by the image processing apparatus according to the third embodiment.

Therein, in the third embodiment, regarding the in-vivo lumen images constituting a set of time-series images; for example, the initial value of the identification criterion is set by processing, in chronological order, groups of images each including a predetermined number of in-vivo lumen images. FIG. 12 is an explanatory diagram for explaining an outline of the processes performed by the image processing apparatus 1b according to the third embodiment. In FIG. 12 is illustrated a set of time-series images formed by in-vivo lumen images beginning with the first in-vivo lumen image up to an N-th in-vivo lumen image. For example, assume that M represents the abovementioned predetermined number of in-vivo lumen images from among the N number of in-vivo lumen images. In that case, an initial value of the identification criterion is created by processing the in-vivo lumen images beginning with the chronologically earliest (first) in-vivo lumen image up to the M-th in-vivo lumen image. More particularly, the M-th in-vivo lumen image is considered as a target in-vivo lumen image to be set referred to as "It" and the chronological section from the first in-vivo lumen image to the M-th in-vivo lumen image is considered as the initial value setting section. Then, in order to create the initial value of the identification criterion, the in-vivo lumen images from the first in-vivo lumen image up to the M-th in-vivo lumen image are sequentially processed in chronological order (beginning with the chronologically earliest in-vivo lumen image up to the chronologically latest in-vivo lumen image) as illustrated by an arrow A11 in FIG. 12. Then, in an identical manner to that described in the first embodiment, the normal mucosa regions in the in-vivo lumen images are identified and the identification criterion is created/updated. Once the M-th target in-vivo lumen image to be set is processed, the identification criterion at that point of time is set as the initial value.

Once the initial value is set in the abovementioned manner, the in-vivo lumen images beginning with the M-1-th in-vivo lumen image up to the first in-vivo lumen image are sequentially processed in reverse chronological order (beginning with the chronologically latest in-vivo lumen image up to the chronologically earliest in-vivo lumen image) as illustrated by an arrow A12 in FIG. 12. Then, in an identical manner to that described in the first embodiment, the normal mucosa regions in the in-vivo lumen images are identified while creating/updating the identification criterion. Once the first in-vivo lumen image is processed, the identification criterion at that point of time is reset as the initial value. Subsequently, as illustrated by an arrow A13, the in-vivo lumen images from the M-th in-vivo lumen image (target in-vivo lumen image to be set) up to the N-th in-vivo lumen image are sequentially processed in chronological order (beginning with the chronologically earliest in-vivo lumen image up to the chronologically latest in-vivo lumen image). Then, in an identical manner to that described in the first embodiment, the normal mucosa regions in the in-vivo lumen images are identified while creating/updating the identification criterion.

Herein, in the in-vivo lumen images positioned close from each other in chronological distance, the mucosal color shows similarity. In contrast, in the in-vivo lumen images positioned far from each other in chronological distance, there is no similarity in the mucosal color. Thus, in order to prevent misidentification due to such differences in the mucosal color, the initial value is set only after the in-vivo lumen images beginning with the target in-vivo lumen image to be set up to the first in-vivo lumen image are sequentially processed as illustrated by the arrow A12. That is, if the identification criterion at that point of time at which the processing up to the first in-vivo lumen image is complete is applied to the target in-vivo lumen image to be set, then there remains a possibility of misidentification caused by the differences in the mucosal color occurring because of the large chronological distance between the first in-vivo lumen image and the M-th in-vivo lumen image. In that regard, as the initial value at the time of sequentially processing the in-vivo lumen images beginning with the target in-vivo lumen image to be set up to the chronologically latest in-vivo lumen image (arrow A13), that identification criterion is used which is created by processing the in-vivo lumen images beginning with the first in-vivo lumen image up to the M-th in-vivo lumen image (arrow A11). Therefore, in the third embodiment, at the time of processing the in-vivo lumen images beginning with the M-1-th in-vivo lumen image up to the first in-vivo lumen image in reverse chronological order (arrow A12) and at the time of processing the in-vivo lumen images beginning with the M-th in-vivo lumen image up to the N-th in-vivo lumen image in chronological order (arrow A13), that identification criterion is set as the initial value which is created by processing the in-vivo lumen images constituting the initial value setting section.

Figure 13:
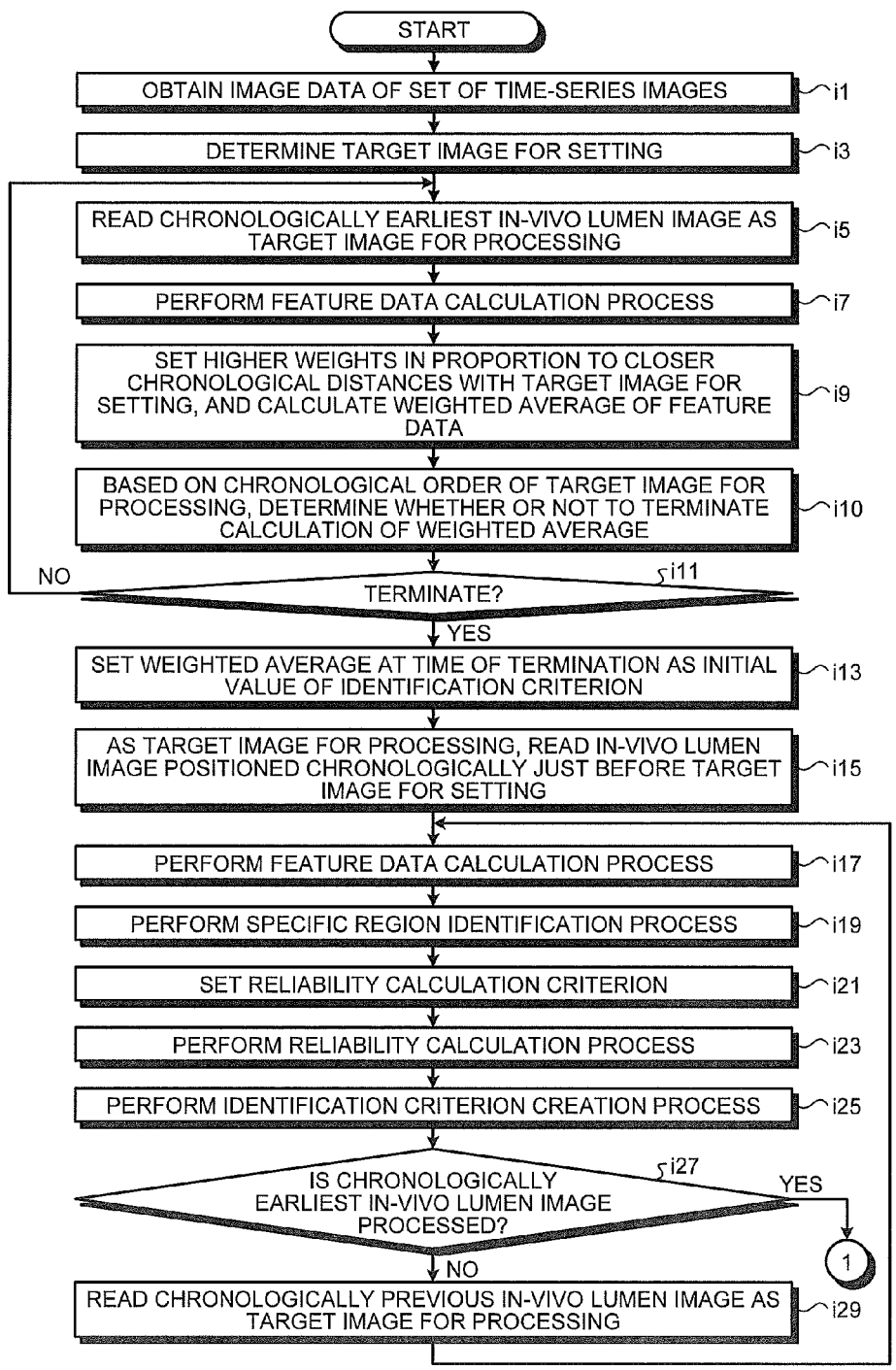
FIG. 13 is an exemplary overall flowchart of the sequence of processes performed by the image processing apparatus according to the third embodiment.
Figure 14:
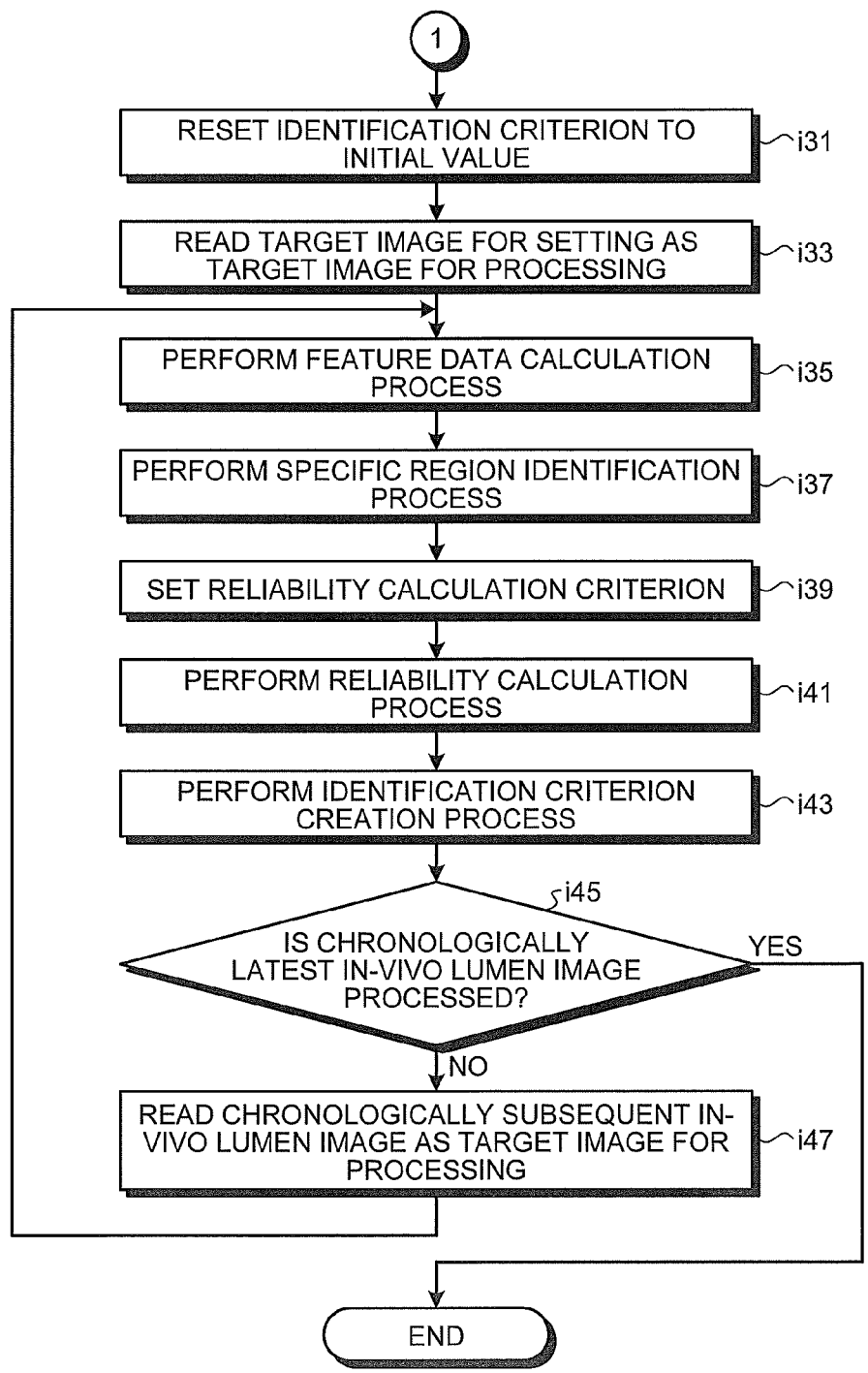
FIG. 14 is an exemplary overall flowchart of the sequence of processes performed following the processes illustrated in FIG. 13.

FIG. 13 and FIG. 14 are exemplary overall flowcharts of the sequence of processes performed by the image processing apparatus 1b according to the third embodiment. The processes explained herein are performed by the constituent elements of the image processing apparatus 1b according to the instructions written in the image processing program 141b that is stored in the recording unit 14b.

As illustrated in FIG. 13, firstly, the image obtaining obtains the image data of a set of time-series images (Step i1). Subsequently, the operation termination control unit 230b sets an initial value setting section in which the initial value is to be set, and sets the last in-vivo lumen image in that initial value setting section as the target in-vivo lumen image to be set (Step i3). More particularly, as explained with reference to FIG. 12, as the initial value setting section, the operation termination control unit 230b sets a chronological section including a group of a predetermined number of in-vivo lumen images beginning with the first in-vivo lumen image; and sets the last in-vivo lumen image in that initial value setting section as the target in-vivo lumen image to be set. Meanwhile, the predetermined number of in-vivo lumen images from the start of the initial value setting section (i.e., the number of in-vivo lumen images in the chronological section to be set as the initial value setting section) can be either a fixed value or a value set changeably by the user operation.

Subsequently, the operating unit 20b reads the chronologically earliest in-vivo lumen image, which constitutes the set of time-series images obtained at Step i1, as the target in-vivo lumen image to be processed (Step i5). Then, the initial-value weighted average calculating unit 229b performs the feature data calculation process in which the target in-vivo lumen image to be processed is segmented into segmented regions and, for each segmented region, the average of G/R values and the average of B/G values are calculated as the pieces of feature data (Step i7). This feature data calculation process is performed in an identical sequence as described with reference to FIG. 3.

Subsequently, the initial-value weighted average calculating unit 229b sets weights in such a manner that, closer the chronological distance between the target in-vivo lumen image to be processed and the target in-vivo lumen image to be set, higher the weight; and calculates a weighted average of the pieces of feature data of the normal mucosa regions (Step i9). More particularly, the initial-value weighted average calculating unit 229b calculates the frequency distribution in the two-dimensional feature plane of the pieces of feature data (the average of G/R values and the average of B/G values) of each segmented region calculated at Step i7, and normalizes the frequency distribution in such a way that the total of frequencies is equal to 100. Then, using Equation (4) given above, the initial-value weighted average calculating unit 229b performs processes identical to the processes performed at Step e7 to Step e9 illustrated in FIG. 6; and sets a weight based on the chronological distance between the normalized frequency distribution of the pieces of feature data of the target in-vivo lumen image to be processed and the frequency distribution obtained previously by calculating the weighted average at Step i9, performs weight addition, and sets the weighted average of the pieces of feature data of the normal mucosa regions.

Subsequently, at Step i10, on the basis of the chronological order of the target in-vivo lumen image to be processed, the operation termination control unit 230b determines whether or not to terminate the calculation of weighted average. Unless the chronological order of the target in-vivo lumen image to be processed does not match with the chronological order of the target in-vivo lumen image to be set, the operation termination control unit 230b determines not to terminate the calculation of weighted average (No at Step i11), and the system control returns to Step i5. On the other hand, when the chronological order of the target in-vivo lumen image to be processed matches with the chronological order of the target in-vivo lumen image to be set and when the processing of the target in-vivo lumen image to be set is also complete, the operation termination control unit 230b determines to terminate the calculation of weighted average (Yes at Step i11), and the system control proceeds to Step i13.

Then, at Step i13, as the initial value of the identification criterion, the initial value setting unit 221b sets the weighted average at the time of termination of the calculation of weighted average, that is, sets the weighted average calculated at Step i9 just before it is determined at Step i10 and Step i11 to terminate the calculation of weighted average.

Subsequently, as the target in-vivo lumen image to be processed, the operating unit 20b reads that in-vivo lumen image which is positioned chronologically just before the target in-vivo lumen image to be set (Step i15). With respect to the newly-read in-vivo lumen image, the feature data calculating unit 21 performs the feature data calculation process (Step i17); the specific region identifying unit 25 performs the specific region identification process (Step i19); the reliability-calculation-criterion setting unit 226 sets the reliability calculation criterion (Step i21); the reliability calculating unit 225 performs the reliability calculation process (Step i23); and the identification criterion creating unit 22b performs the identification criterion creation process (Step i25). Herein, the sequence of processes at Step i17 is identical to the sequence of the feature data calculation process explained with reference to FIG. 3; the sequence of processes at Step i19 is identical to the sequence of the specific region identification process explained with reference to FIG. 4; the process performed at Step i21 is identical to the process performed at Step a11 illustrated in FIG. 2; the sequence of processes at Step i23 is identical to the sequence of the reliability calculation process explained with reference to FIG. 5; and the sequence of processes at Step i25 is identical to the sequence of the identification criterion creation process explained with reference to FIG. 6.

Subsequently, the operating unit 20b determines whether or not the chronologically earliest in-vivo lumen image has been processed. If the chronologically earliest in-vivo lumen image is not yet processed (No at Step i27), the operating unit 20b reads from the recording unit 14b that in-vivo lumen image which is positioned chronologically just before the in-vivo lumen image that has been processed most recently, and sets the newly-read in-vivo lumen image as the target in-vivo lumen image to be processed (Step i29); and selects that in-vivo lumen image to be processed. Then, the system control returns to Step i17 so that the processes from Step i17 to Step i25 are performed on the newly-selected in-vivo lumen image.

On the other hand, if the chronologically earliest in-vivo lumen image has been processed, that is, if the processes from Step i17 to Step i25 have already been performed with respect to all in-vivo lumen images on the chronologically earlier side of the target in-vivo lumen image to be set (Yes at Step i27); the system control proceeds to Step i31 illustrated in FIG. 14.

Thereat, the initial value setting unit 221b resets the identification criterion to the initial value set at Step i13 illustrated in FIG. 13 (Step i31). Then, the operating unit 20b reads the target in-vivo lumen image to be set and considers it to be the target in-vivo lumen image to be processed (Step i33). With respect to the target in-vivo lumen image to be processed, the feature data calculating unit 21 performs the feature data calculation process (Step i35); the specific region identifying unit 25 performs the specific region identification process (Step i37); the reliability-calculation-criterion setting unit 226 sets the reliability calculation criterion (Step i39); the reliability calculating unit 225 performs the reliability calculation process (Step i41); and the identification criterion creating unit 22b performs the identification criterion creation process (Step i43). Herein, the sequence of processes at Step i35 is identical to the sequence of the feature data calculation process explained with reference to FIG. 3; the sequence of processes at Step i37 is identical to the sequence of the specific region identification process explained with reference to FIG. 4; the process performed at Step i39 is identical to the process performed at Step a11 illustrated in FIG. 2; the sequence of processes at Step i41 is identical to the sequence of the reliability calculation process explained with reference to FIG. 5; and the sequence of processes at Step i43 is identical to the sequence of the identification criterion creation process explained with reference to FIG. 6.

Subsequently, the operating unit 20b determines whether or not the chronologically latest in-vivo lumen image has been processed. If the chronologically latest in-vivo lumen image is not yet processed (No at Step i45); the operating unit 20b reads, from the recording unit 14b, that in-vivo lumen image which is positioned chronologically subsequent to the in-vivo lumen image that has been processed most recently and sets the newly-read in-vivo lumen image as the target in-vivo lumen image to be processed (Step i47); and selects that in-vivo lumen image to be processed. Then, the system control returns to Step i35 so that the processes from Step i35 to Step i43 are performed on the newly-selected in-vivo lumen image.

On the other hand, if the chronologically latest in-vivo lumen image has already been processed, that is, if the processes from Step i35 to Step i43 have already been performed with respect to all in-vivo lumen images on the chronologically latter side of the target in-vivo lumen image to be set (Yes at Step i45); then the processes are terminated.

As described above, in the third embodiment, instead of keeping the in-vivo lumen images capturing the normal mucosa regions ready and instead of having the initial value created in advance, the in-vivo lumen images constituting a set of time-series images are sequentially processed and the identification criterion is created/updated in order to create the initial value. That makes it possible to prevent a decrease in the accuracy of the initial value. As a result, the effect of noise can be reduced thereby enabling achieving enhancement in the accuracy of identifying the normal mucosa regions.

In the third embodiment, the initial value of the identification criterion is set by processing groups of images each including a predetermined number of in-vivo lumen images, which constitute a time-series image, in chronological order. However, alternatively, it is also possible to have a configuration in which the determination of whether or not to terminate the calculation of weighted average can be performed on the basis of the weighted average of the pieces of feature data of the normal mucosa regions that is calculated at Step i9 illustrated in FIG. 3. Meanwhile, since the usual mucosa has variations in colors, the variance value increases to an extent. Therein, for example, depending on whether or not the variance value of the weighted average of the pieces of feature data of the normal mucosa regions exceeds a threshold value set in advance, it can be determined whether or not to terminate the calculation of weighted average. In that case, instead of performing the process at Step i10, the operation termination control unit 230b calculates the variance value of the weighted average that is calculated for each instance of performing the process at Step i9, and determines whether or not to terminate the calculation of weighted average depending on whether or not the calculated variance value exceeds the threshold value set in advance. Subsequently, instead of performing the process at Step i11, the operation termination control unit 230b determines to terminate the calculation of weighted average if the variance value of the weighted average calculated in the abovementioned manner exceeds the threshold value. On the other hand, as long as the variance value of the weighted average is equal to or smaller than the threshold value, the operation termination control unit 230b determines not to terminate the calculation of weighted average.

Fourth Embodiment

Figure 15:
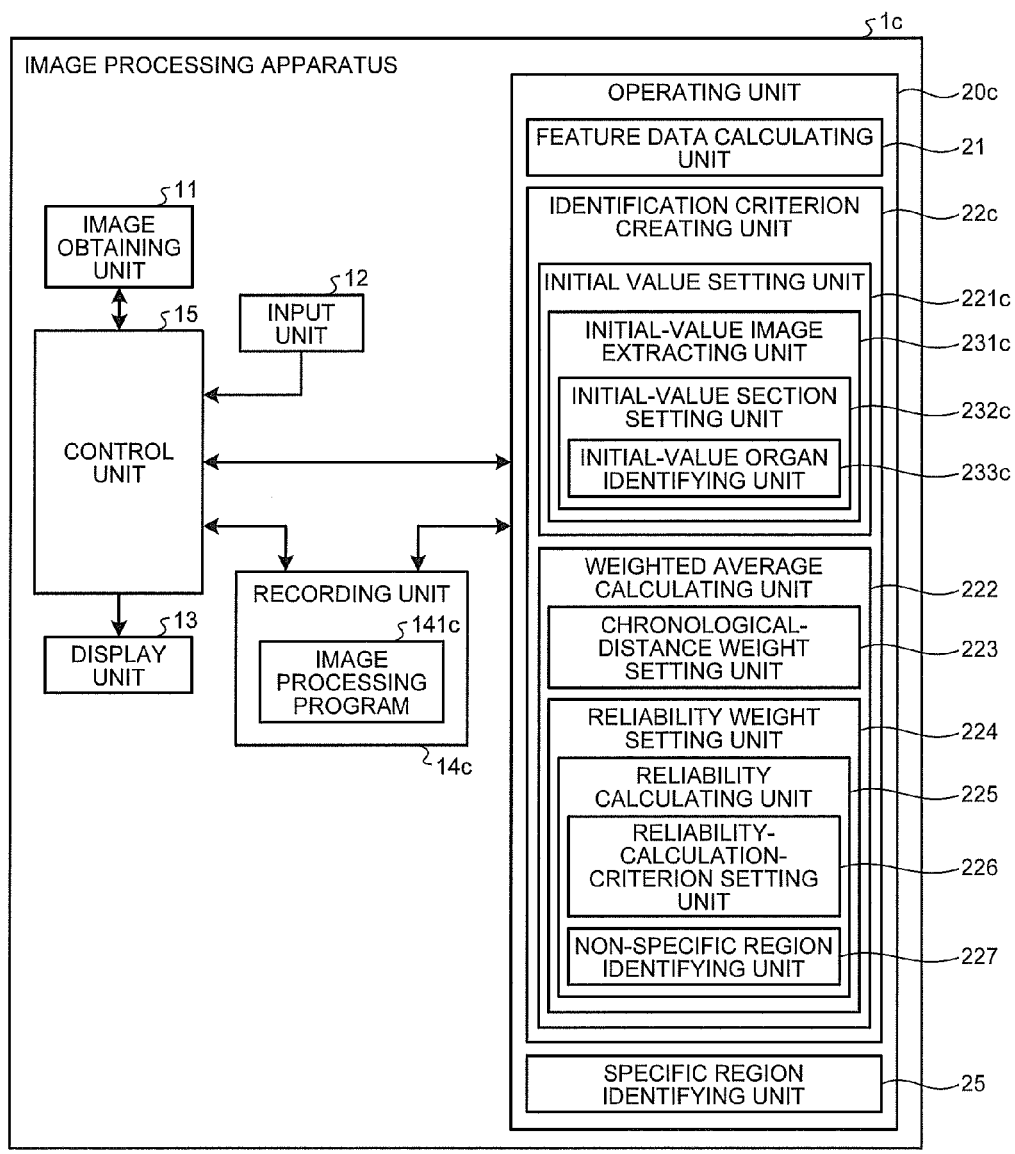
FIG. 15 is an exemplary block diagram of a functional configuration of an image processing apparatus according to a fourth embodiment of the present invention.

Explained below is an image processing apparatus according a fourth embodiment of the present invention. FIG. 15 is an exemplary block diagram of a functional configuration of an image processing apparatus 1c according to the fourth embodiment. Herein, the constituent elements identical to the constituent elements described in the first embodiment are referred to by the same reference numerals. As illustrated in FIG. 15, the image processing apparatus 1c according to the fourth embodiment includes the image obtaining unit 11, the input unit 12, the display unit 13, a recording unit 14c, an operating unit 20c, and the control unit 15. Herein, the control unit 15 controls, in entirety, the processes of the image processing apparatus 1c.

In the recording unit 14c is stored an image processing program 141c that is executed for identifying normal mucosa regions in each in-vivo lumen image constituting a set of time-series images.

The operating unit 20c includes the feature data calculating unit 21, an identification criterion creating unit 22c, and the specific region identifying unit 25. The identification criterion creating unit 22c includes an initial value setting unit 221c and the weighted average calculating unit 222. The initial value setting unit 221c is a functional unit for setting the initial value of the identification criterion used at the time of processing the chronologically earliest in-vivo lumen image. Besides, the initial value setting unit 221c includes an initial-value image extracting unit 231c. More particularly, the initial-value image extracting unit 231c is a functional unit for extracting a plurality of in-vivo lumen images from the in-vivo lumen images constituting a set of time-series images. The initial-value image extracting unit 231c further includes an initial-value section setting unit 232c. Herein, the initial-value section setting unit 232c is a functional unit for setting a chronological section from which the initial-value image extracting unit 231c extracts the images. Moreover, the initial-value section setting unit 232c further includes an initial-value organ identifying unit 233c which identifies the type of organ captured in each in-vivo lumen image. Meanwhile, the weighted average calculating unit 222 further includes the chronological-distance weight setting unit 223 and the reliability weight setting unit 224. Moreover, the reliability weight setting unit 224 further includes the reliability calculating unit 225, which in turn includes the reliability-calculation-criterion setting unit 226 and the non-specific region identifying unit 227.

Figure 16:
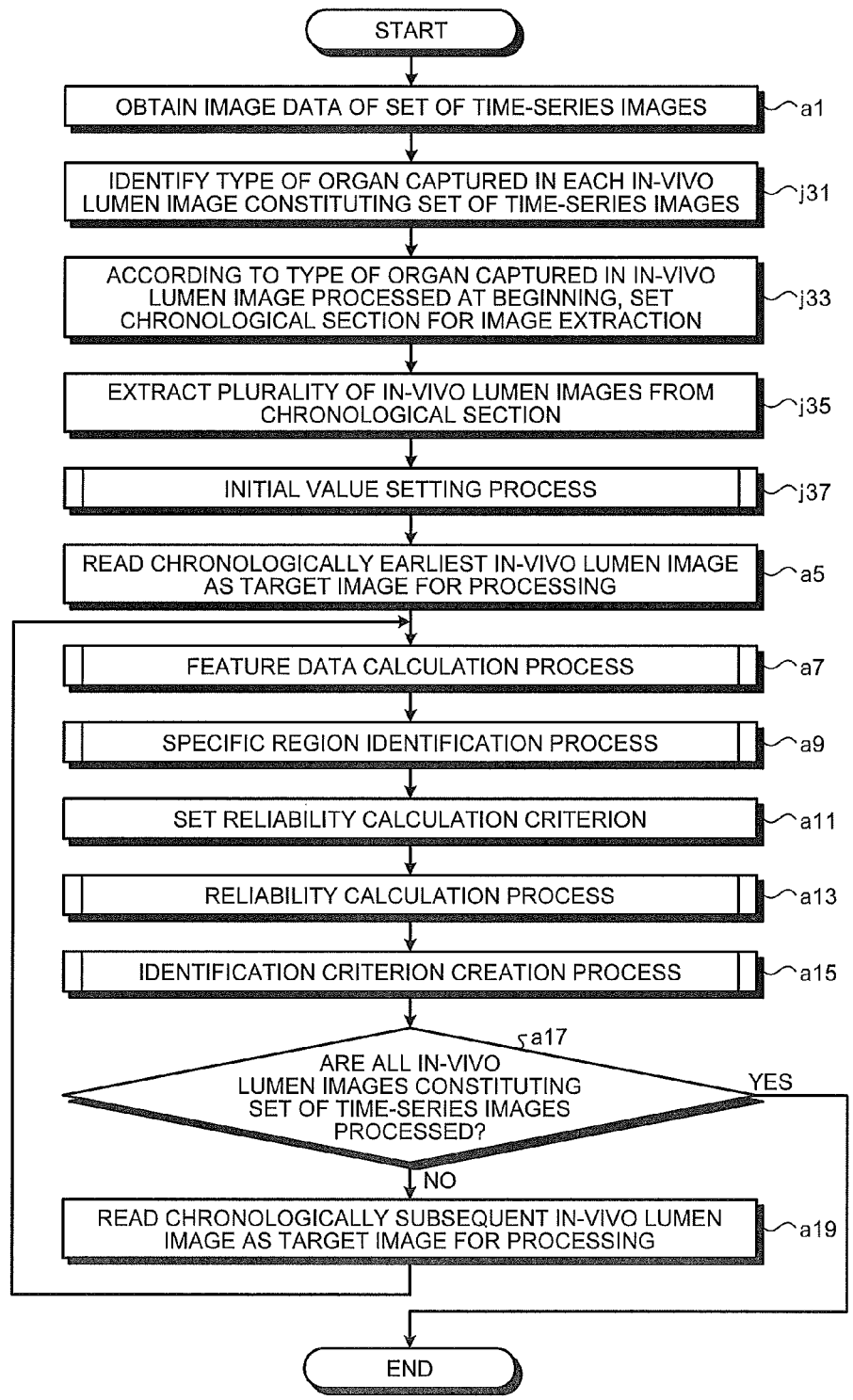
FIG. 16 is an exemplary overall flowchart of the sequence of processes performed by the image processing apparatus according to the fourth embodiment.

FIG. 16 is an exemplary overall flowchart of the sequence of processes performed by the image processing apparatus 1c according to the fourth embodiment. The processes explained herein are performed by the constituent elements of the image processing apparatus 1c according to the instructions written in the image processing program 141c that is stored in the recording unit 14c. Meanwhile, those steps in FIG. 16 which are identical to the steps described in the first embodiment are referred to by the same step numbers.

As illustrated in FIG. 16, in the fourth embodiment, once the image obtaining unit 11 obtains the image data of a set of time-series images at Step a1, the initial-value organ identifying unit 233c considers each in-vivo lumen image constituting a set of time-series images as the target image for identification and sequentially identifies the type of organ captured in each target image for identification (Step j31).

Regarding the method of identifying the type of organ, it is possible to implement an appropriate known technology. For example, the technology disclosed in Japanese Laid-open Patent Publication No. 2006-288612 is implemented to perform identification based on the average R value, the average G value, and the average B value in an in-vivo lumen image. More particularly, the numerical range of the average R value, the average G value, and the average B value for each organ type is set in advance. For example, assume that the organ types under consideration are the esophagus, the stomach, the small intestine, and the large intestine. In that case, the numerical range of the average R value, the average G value, and the average B value is set in advance for each of the esophagus, the stomach, the small intestine, and the large intestine. Then, in a target in-vivo lumen image for identification, the average of R values is calculated as the average R value; the average of G values is calculated as the average G value; and the average of R values is calculated as the average B value. If the average R value, the average G value, and the average B value are within the numerical range of the average R value, the average G value, and the average B value for the esophagus; then the esophagus is identified as the type of organ captured for observation in that in-vivo lumen image. Similarly, if the average R value, the average G value, and the average B value in the target in-vivo lumen image for identification are within the numerical range of the average R value, the average G value, and the average B value for the stomach; then the stomach is identified as the type of organ captured for observation in that in-vivo lumen image. Moreover, if the average R value, the average G value, and the average B value in the target in-vivo lumen image for identification are within the numerical range of the average R value, the average G value, and the average B value for the small intestine; then the small intestine is identified as the type of organ captured for observation in that in-vivo lumen image. Furthermore, if the average R value, the average G value, and the average B value in the target in-vivo lumen image for identification are within the numerical range of the average R value, the average G value, and the average B value for the large intestine; then the large intestine is identified as the type of organ captured for observation in that in-vivo lumen image. Meanwhile, as long as the type of organ captured in an in-vivo lumen image can be identified, any other method can also be implemented.

Subsequently, according to the type of organ captured in the in-vivo lumen image processed at the beginning (i.e., in the chronologically earliest in-vivo lumen image), the initial-value section setting unit 232c sets a chronological section for image extraction (Step j33). More particularly, according to the type of organ captured in each in-vivo lumen image identified at Step j31, the initial-value section setting unit 232c sets a chronological section in which the organ of the organ type identified in the chronologically earliest in-vivo lumen image is captured. For example, assume that in the case of processing the in-vivo lumen images, beginning with the chronologically earliest in-vivo lumen image, constituting a set of time-series images captured using a capsule endoscope or the like; the esophagus in normal condition appears in the chronologically earliest in-vivo lumen image. In that case, on the basis of the chronological order of the in-vivo lumen images identified to have captured the esophagus as the organ type, the initial-value section setting unit 232c sets a chronological section in which the esophagus is captured at Step j33.

Then, from among the in-vivo lumen images constituting the chronological section set at Step j33, the initial-value section setting unit 232c extracts a plurality of in-vivo lumen images by means of, for example, random selection (Step j35). Herein, the number of images to be extracted can be either a fixed value or a value set changeably by the user process.

Figure 17:
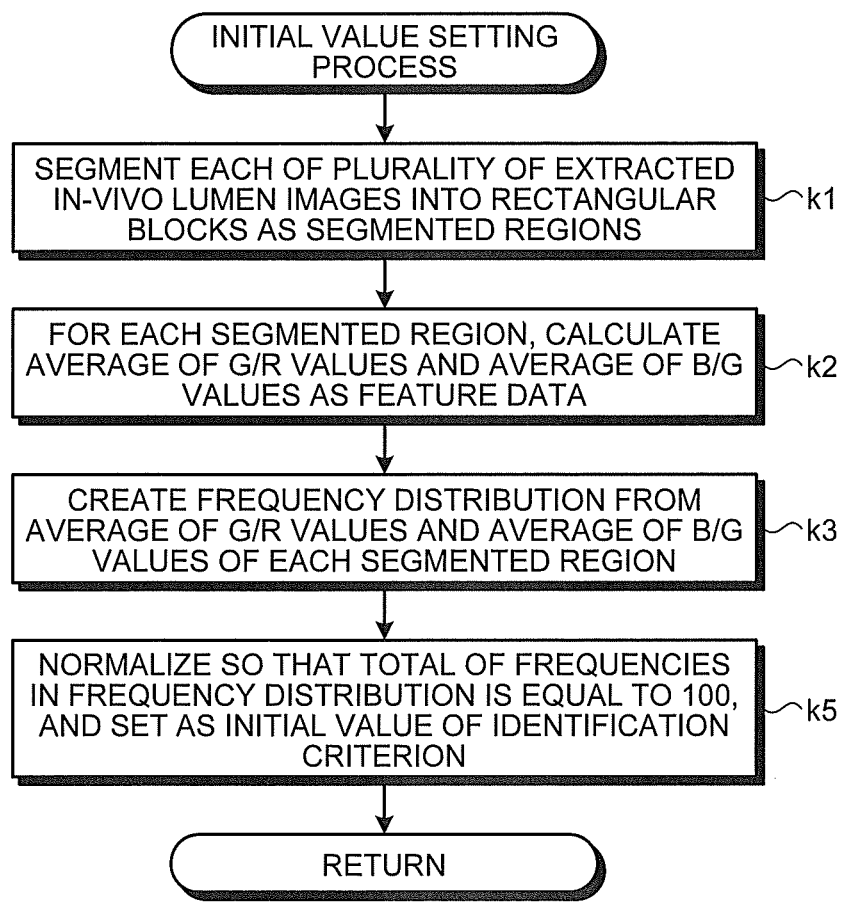
FIG. 17 is an exemplary flowchart for explaining the detailed sequence of an initial value setting process according to the fourth embodiment.

Subsequently, the initial value setting unit 221c performs an initial value setting process at Step j37. FIG. 17 is an exemplary flowchart for explaining the detailed sequence of the initial value setting process. In the initial value setting process, firstly, the initial value setting unit 221c segments each in-vivo lumen image, which is extracted at Step j35 illustrated in FIG. 16, into rectangular blocks of 8×8 pixels as segmented regions (Step k1). Then, as the pieces of feature data of each segmented region, the initial value setting unit 221c calculates the average of G/R values and the average of B/G values (Step k2). More particularly, for each segmented region, the initial value setting unit 221c calculates the average of G/R values in each pixel within the segmented region according to Equation (1) and calculates the average of B/G values in each pixel within the segmented region according to Equation (2).

Subsequently, regarding each of the extracted in-vivo lumen images, the initial value setting unit 221c calculates the frequency distribution in a two-dimensional feature plane of the pieces of feature data (the average of G/R values and the average of B/G values) calculated for each segmented region (Step k3), and then normalizes the frequency distribution in such a way that the total of frequencies is equal to 100 and sets the normalized frequency distribution as the initial value of the identification criterion (Step k5). Then, the system control returns to Step j37 illustrated in FIG. 16 and proceeds to Step a5.

In the first embodiment described earlier, the in-vivo lumen images capturing the normal mucosa regions are kept ready and the initial value of the identification criterion is created on the basis of the pieces of feature data of those in-vivo lumen images. However, the mucosal color appearing in each in-vivo lumen image may vary depending on the type of organ captured therein. Therein, although the initial value of the identification criterion created in advance is used for the identification of the normal mucosa regions in the first target in-vivo lumen image to be processed; if the type of organ captured in the first target in-vivo lumen image to be processed does not match with the type of organ captured in the in-vivo lumen images that are kept ready, then the accuracy of the initial value may decrease due to the possibility of differences in the mucosal color.

In that regard, in the fourth embodiment, depending on the type of organ captured in the chronologically earliest in-vivo lumen image, the initial value of the identification criterion is crated using the pieces of feature data of those in-vivo lumen images which capture the same organ as the organ captured in the chronologically earliest in-vivo lumen image. More particularly, a plurality of in-vivo lumen images are extracted that capture the same organ as the organ captured in the chronologically earliest in-vivo lumen image, and the initial value of the identification criterion is created on the basis of the pieces of feature data of each of the extracted in-vivo lumen images. Herein, in the in-vivo lumen images, the normal mucosa regions account for the majority of regions. Hence, if the frequency distribution is created by calculating the pieces of feature data for a large number of in-vivo lumen images, the region in the vicinity of the mode value of the frequency distribution is a normal mucosa region.

In this way, according to the fourth embodiment, the initial value of the identification criterion can be created on the basis of the pieces of feature data of those in-vivo lumen images which capture the same organ as the organ captured in the chronologically earliest in-vivo lumen image processed at the beginning. That makes it possible to create the initial value with high accuracy. Subsequently, regarding the chronologically earliest in-vivo lumen image processed at the beginning, the created initial value can be put to use for the identification of normal mucosa regions. That makes it possible to prevent misidentification of the normal mucosa regions occurring due to the differences in the mucosal color. As a result, the normal mucosa regions can be identified with high accuracy.

Fifth Embodiment

Figure 18:
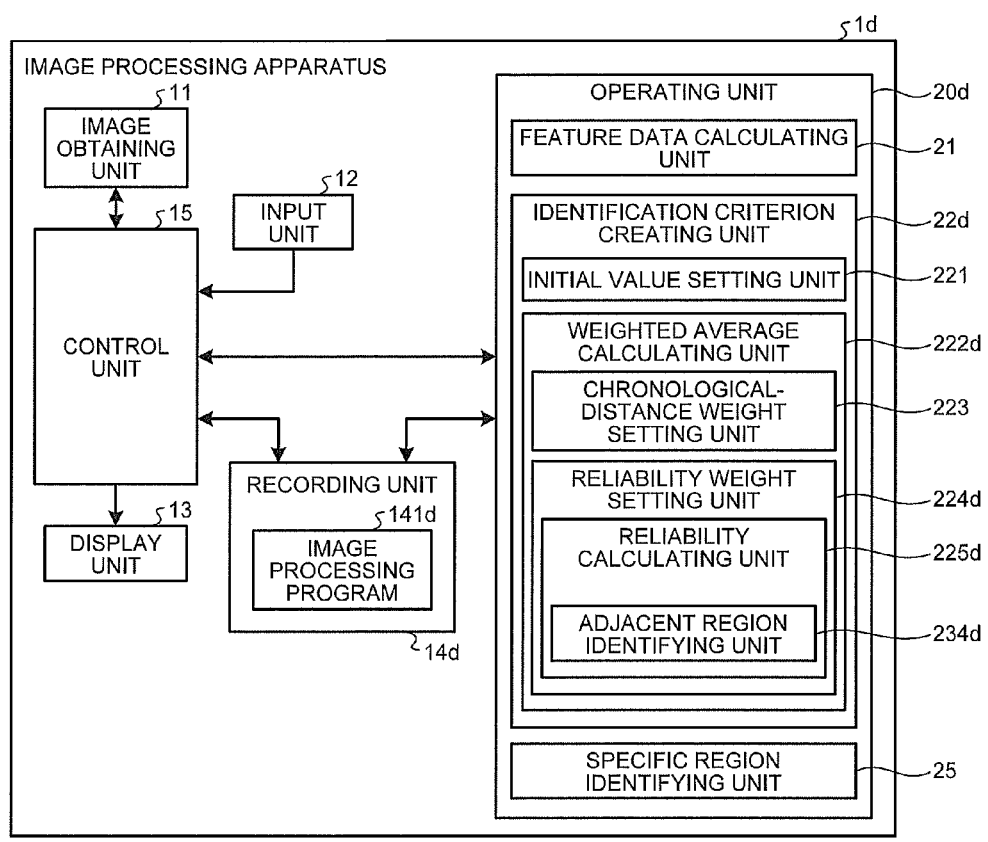
FIG. 18 is an exemplary block diagram of a functional configuration of an image processing apparatus according to a fifth embodiment of the present invention.

Explained below is an image processing apparatus according a fifth embodiment of the present invention. FIG. 18 is an exemplary block diagram of a functional configuration of an image processing apparatus 1d according to the fifth embodiment. Herein, the constituent elements identical to the constituent elements described in the first embodiment are referred to by the same reference numerals. As illustrated in FIG. 18, the image processing apparatus 1d according to the fifth embodiment includes the image obtaining unit 11, the input unit 12, the display unit 13, a recording unit 14d, an operating unit 20d, and the control unit 15. Herein, the control unit 15 controls, in entirety, the process of the image processing apparatus 1d.

In the recording unit 14d is stored an image processing program 141d that is executed for identifying normal mucosa regions in each in-vivo lumen image constituting a set of time-series images.

The operating unit 20d includes the feature data calculating unit 21, an identification criterion creating unit 22d, and the specific region identifying unit 25. The identification criterion creating unit 22d includes the initial value setting unit 221 and a weighted average calculating unit 222d. Moreover, the weighted average calculating unit 222d further includes the chronological-distance weight setting unit 223 and a reliability weight setting unit 224d. Furthermore, the reliability weight setting unit 224d further includes a reliability calculating unit 225d, which in turn includes an adjacent region identifying unit 234d which identifies the adjacent regions that are positioned adjacent to a segmented region identified as a normal mucosa region and determining whether or not any abnormal mucosa region is present in the vicinity of the normal mucosa region.

Figure 19:
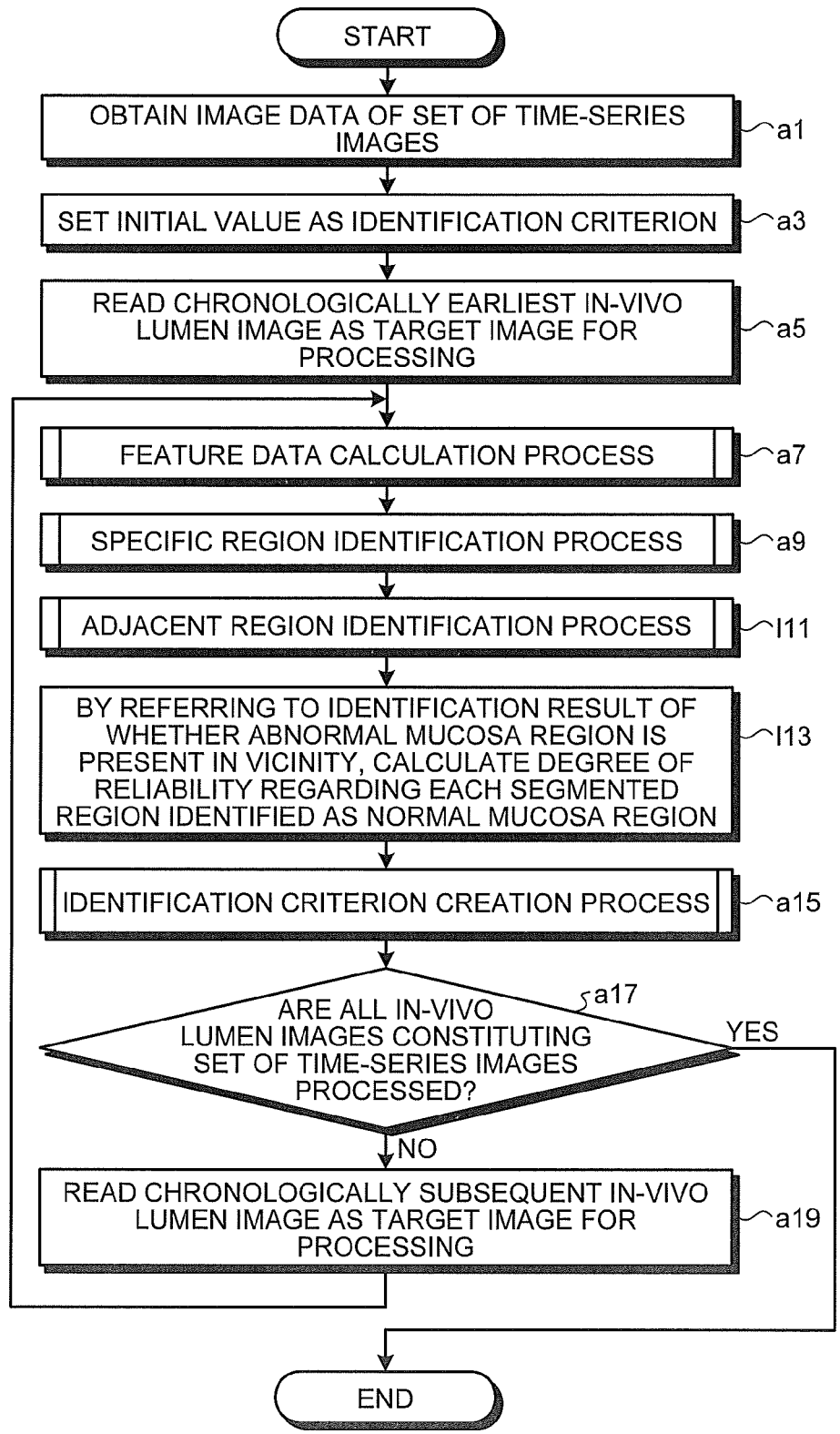
FIG. 19 is an exemplary overall flowchart of the sequence of processes performed by the image processing apparatus according to the fifth embodiment.

FIG. 19 is an exemplary overall flowchart of the sequence of processes performed by the image processing apparatus 1d according to the fifth embodiment. The processes explained herein are performed by the constituent elements of the image processing apparatus 1d according to the instructions written in the image processing program 141d that is stored in the recording unit 14d. Meanwhile, those steps in FIG. 19 which are identical to the steps described in the first embodiment are referred to by the same step numbers.

Figure 20:
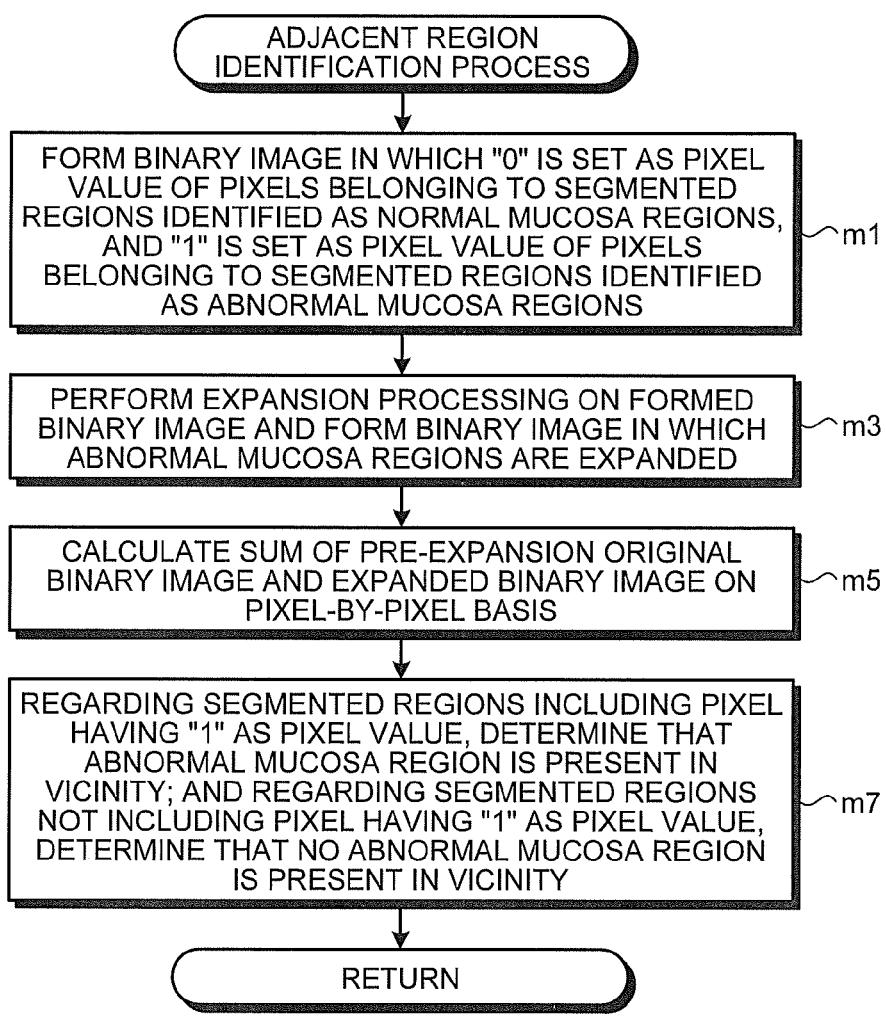
FIG. 20 is an exemplary flowchart for explaining the detailed sequence of an adjacent region identification process according to the fifth embodiment.

As illustrated in FIG. 19, in the fifth embodiment, once the specific region identifying unit 25 performs the specific region identification process and identifies the normal mucosa regions in the target in-vivo lumen image to be processed at Step a9, the adjacent region identifying unit 234d performs an adjacent region identification process (Step l11). FIG. 20 is an exemplary flowchart for explaining the detailed sequence of the adjacent region identification process.

In the adjacent region identification process, firstly, based on the region number image in which the region numbers assigned to the segmented regions are set on a pixel-by-pixel basis and based on the identification result regarding the normal mucosa regions among the segmented regions, the adjacent region identifying unit 234d forms a binary image in which "0" is set as the pixel value of the pixels belonging to the segmented regions identified as the normal mucosa regions and "1" is set as the pixel value of the pixels belonging to the segmented regions identified as the abnormal mucosa regions (Step m1).

Then, with respect to the binary image formed at Step m1, the adjacent region identifying unit 234d performs known expansion processing (see CG-ARTS Society, digital image processing, P179-P180) and forms a binary image in which the abnormal mucosa regions having the pixel value "1" are expanded (Step m3). Subsequently, on a pixel-by-pixel basis, the adjacent region identifying unit 234d calculates the sum of the pre-expansion original binary image (i.e., binary image formed at Step m1) and the expanded binary image (i.e., binary image formed at Step m3) (Step m5).

Then, for each segmented region identified as the normal mucosa region, the adjacent region identifying unit 234d sequentially determines whether there is a pixel for which the value calculated at Step m5 is "1". More particularly, regarding the segmented regions including a pixel for which the value calculated at Step m5 is "1", it is determined that an abnormal mucosa region is present in the vicinity; and regarding the segmented regions not including a pixel for which the value calculated at Step m5 is "1", it is determined that no abnormal mucosa region is present in the vicinity (Step m7). Then, the system control returns to Step l11 illustrated in FIG. 19 and proceeds to Step l13.

Subsequently, at Step l3, by referring to the identification result of whether an abnormal mucosa region is present in the vicinity, the reliability calculating unit 225d calculates the degree of reliability regarding each segmented region identified as the normal mucosa region. More particularly, regarding those segmented regions for which it is determined at Step m7 that an abnormal mucosa region is present in the vicinity, the reliability calculating unit 225d sets the degree of reliability to "0"; and regarding those segmented regions for which it is determined at Step m7 that no abnormal mucosa region is present in the vicinity, the reliability calculating unit 225d sets the degree of reliability to "1". Then, the system control proceeds to Step a15 for the identification criterion creation process.

As described above, in the fifth embodiment, from among the segmented regions identified as the normal mucosa regions, such segmented regions which have in the vicinity thereof a region identified as the abnormal mucosa region are further identified. Then, from among the segmented regions identified as the normal mucosa regions, such segmented regions which have in the vicinity thereof a region identified as the abnormal mucosa region are considered as the segmented regions with intermediate color shades in between the normal mucosa regions and the regions other than the normal mucosa regions, and a low degree of reliability is calculated for such segmented regions. Hence, the identification criterion is created under a condition in which the pieces of feature data of the regions with intermediate color shades are not easily gatherable. That enables achieving enhancement in the accuracy of identifying the normal mucosa regions.

Sixth Embodiment

Figure 21:
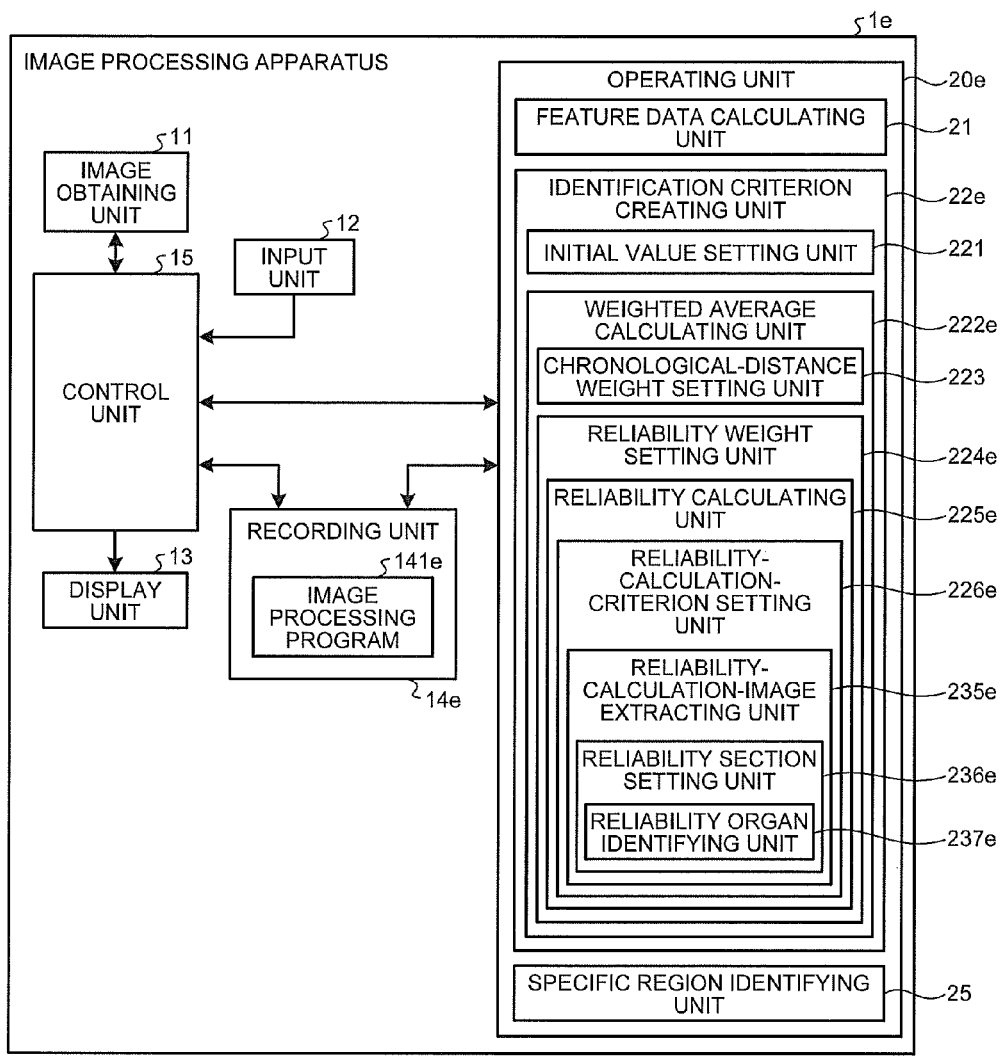
FIG. 21 is an exemplary block diagram of a functional configuration of an image processing apparatus according to a sixth embodiment of the present invention.

Explained below is an image processing apparatus according a sixth embodiment of the present invention. FIG. 21 is an exemplary block diagram of a functional configuration of an image processing apparatus 1e according to the sixth embodiment. Herein, the constituent elements identical to the constituent elements described in the first embodiment are referred to by the same reference numerals. As illustrated in FIG. 21, the image processing apparatus 1e according to the sixth embodiment includes the image obtaining unit 11, the input unit 12, the display unit 13, a recording unit 14e, an operating unit 20e, and the control unit 15. Herein, the control unit 15 controls, in entirety, the processes of the image processing apparatus 1e.

In the recording unit 14e is stored an image processing program 141e that is executed for identifying normal mucosa regions in each in-vivo lumen image constituting a set of time-series images.

The operating unit 20e includes the feature data calculating unit 21, an identification criterion creating unit 22e, and the specific region identifying unit 25. The identification criterion creating unit 22e includes the initial value setting unit 221 and a weighted average calculating unit 222e. Moreover, the weighted average calculating unit 222e further includes the chronological-distance weight setting unit 223 and a reliability weight setting unit 224e. Furthermore, the reliability weight setting unit 224e further includes a reliability calculating unit 225e, which in turn includes a reliability-calculation-criterion setting unit 226e. Moreover, in the sixth embodiment, the reliability-calculation-criterion setting unit 226e includes a reliability-calculation-image extracting unit 235e. More particularly, the reliability-calculation-image extracting unit 235e is a functional unit that extracts a plurality of in-vivo lumen images from among the in-vivo lumen images constituting a set of time-series images, and that includes a reliability section setting unit 236e. More particularly, the reliability section setting unit 236e is a functional unit that sets a chronological section from which images are extracted by the reliability-calculation-image extracting unit 235e, and that includes a reliability organ identifying unit 237e. More particularly, the reliability organ identifying unit 237e identifies the type of organ captured in each in-vivo lumen image.

Figure 22:
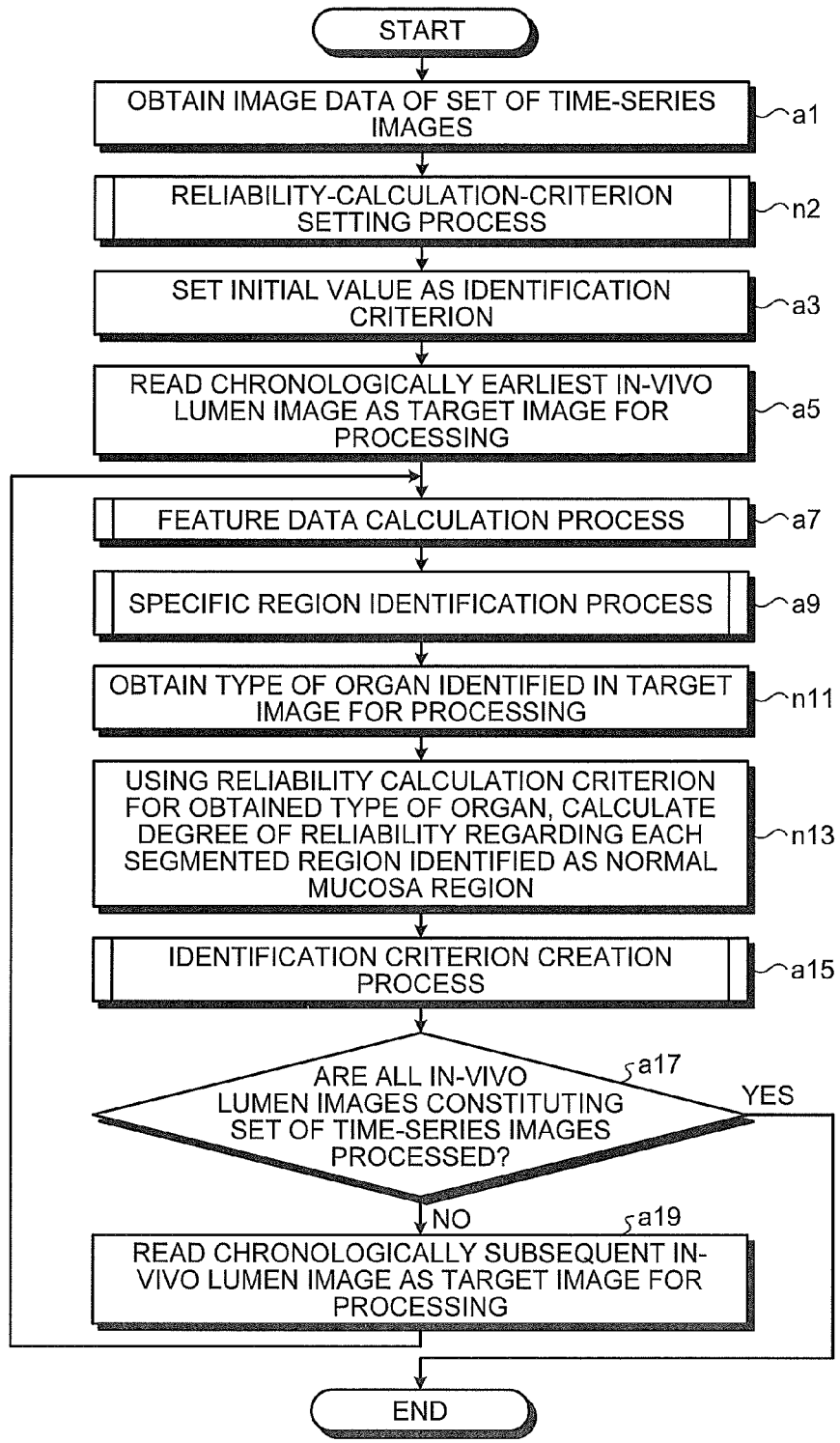
FIG. 22 is an exemplary overall flowchart of the sequence of processes performed by the image processing apparatus according to the sixth embodiment.

FIG. 22 is an exemplary overall flowchart of the sequence of processes performed by the image processing apparatus 1e according to the sixth embodiment. The processes explained herein are performed by the constituent elements of the image processing apparatus 1e according to the instructions written in the image processing program 141e that is stored in the recording unit 14e. Meanwhile, those steps in FIG. 22 which are identical to the steps described in the first embodiment are referred to by the same step numbers.

Figure 23:
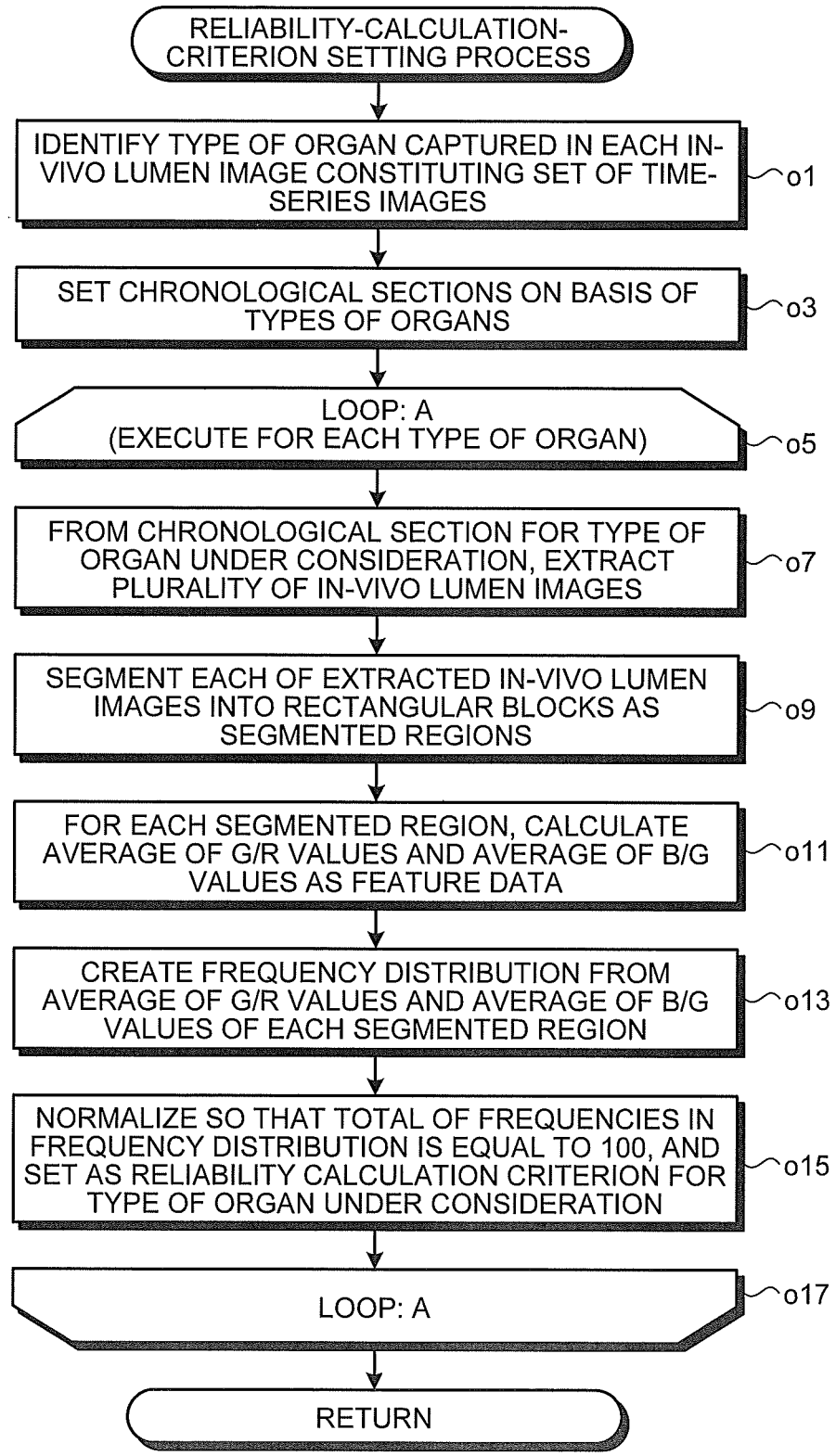
FIG. 23 is an exemplary flowchart for explaining the detailed sequence of a reliability-calculation-criterion setting process according to the sixth embodiment.

As illustrated in FIG. 22, in the sixth embodiment, once the image obtaining unit 11 obtains the image data of a set of time-series images at Step a1, the reliability-calculation-criterion setting unit 226e in the operating unit 20e performs a reliability-calculation-criterion setting process (Step n2). FIG. 23 is an exemplary flowchart for explaining the detailed sequence of the reliability-calculation-criterion setting process.

In the reliability-calculation-criterion setting process, firstly, the reliability organ identifying unit 237e considers each in-vivo lumen image constituting a set of time-series images as the target image for identification and sequentially identifies the type of organ captured in each target image for identification (Step o1). This process is performed in the same manner as explained at Step j31 illustrated in FIG. 16 according to the fourth embodiment.

Subsequently, based on the identification result obtained at Step o1, the reliability section setting unit 236e sets chronological sections on the basis of the types of organs (Step o3). For example, assume that the organ types are the esophagus, the stomach, the small intestine, and the large intestine. In that case, at Step o3, the reliability section setting unit 236e sets a chronological section that includes the in-vivo lumen images capturing the esophagus, sets a chronological section that includes the in-vivo lumen images capturing the stomach, sets a chronological section that includes the in-vivo lumen images capturing the small intestine, and sets a chronological section that includes the in-vivo lumen images capturing the large intestine.

Then, for each type of organ for which a chronological section is set at Step o3, the processes within a loop A (from Step o5 to Step o17) are performed. In the loop A, firstly, from among the in-vivo lumen images constituting the chronological section set at Step o3 regarding the type of organ under consideration, the reliability-calculation-image extracting unit 235e extracts a plurality of in-vivo lumen images constituting that chronological section by means of, for example, random selection (Step o7). Herein, the number of images to be extracted can be either a fixed value or a value set changeably by the user process.

Then, the reliability-calculation-criterion setting unit 226e segments each of the in-vivo lumen images extracted at Step o7 into rectangular blocks of, for example, 8×8 pixels as segmented regions (Step o9). Subsequently, for each segmented region, the reliability-calculation-criterion setting unit 226e calculates the average of G/R values and the average of B/G values as the pieces of feature data (Step o11). More particularly, for each segmented region, the reliability-calculation-criterion setting unit 226e calculates the average of G/R values in each pixel within the segmented region according to Equation (1) and calculates the average of B/G values in each pixel within the segmented region according to Equation (2).

Subsequently, regarding each of the extracted in-vivo lumen images, the reliability-calculation-criterion setting unit 226e calculates the frequency distribution in a two-dimensional feature plane of the pieces of feature data (the average of G/R values and the average of B/G values) calculated for each segmented region (Step o13), and then normalizes the frequency distribution in such a way that the total of frequencies is equal to 100 and sets the normalized frequency distribution as a reliability calculation criterion regarding the types of organs under consideration (Step o15).

In this way, once the processes within the loop A are performed with respect to each type of organ and the reliability calculation criterion is set for each type of organ, the system control returns to Step n2 illustrated in FIG. 22 and then proceeds to Step a3.

Moreover, in the sixth embodiment, once the specific region identifying unit 25 performs the specific region identification process and identifies the normal mucosa regions in the target in-vivo lumen image to be processed at Step a9, the reliability calculating unit 225e obtains the type of organ identified with respect to the target in-vivo lumen image to be processed at Step o1 illustrated in FIG. 23 (Step n11). Subsequently, for each segmented region identified as the normal mucosa region in the target in-vivo lumen image to be processed, the reliability calculating unit 225e calculates the degree of reliability (Step n13). Then, the system control proceeds to Step a15.

More particularly, the reliability calculating unit 225e calculates the degree of reliability according to the reliability calculation criterion set regarding the type of organ captured in the target in-vivo lumen image to be processed. That is, the reliability calculating unit 225e sequentially processes those segmented regions which are identified as normal mucosa regions and then calculates the Mahalanobis' generalized distance between the pieces of feature data (the average of G/R values and the average of B/G values) of the segmented region under consideration and the reliability calculation criterion (i.e., the frequency distribution of the pieces of feature data of each segmented region in the in-vivo lumen images capturing the same organ as the organ captured in the target in-vivo lumen image to be processed) set in the reliability-calculation-criterion setting process, which is performed at Step n2 with respect to the type of organ obtained at Step n11.

Subsequently, based on the Mahalanobis' generalized distance, the reliability calculating unit 225e calculates a degree of reliability T according to Equations (5) and (6) given below. In Equations (5) and (6), Maha represents the Mahalanobis' generalized distance that has been calculated. Thus, the reliability calculating unit 225e calculates the degree of reliability T of the segmented region under consideration for two different cases, namely, a case when the Mahalanobis' generalized distance Maha is equal to or smaller than 0.1 and a case when the Mahalanobis' generalized distance Maha is greater than 0.1.

$$T = 1, \text{ if } Maha \leq 0.1 \tag{5}$$

$$T = \frac{1}{|Maha| \times 10}, \text{ if } Maha > 0.1 \tag{6}$$

As described above, according to the sixth embodiment, the type of organ, captured in each in-vivo lumen image constituting a set of time-series images, is identified and a chronological section for each type of organ is set. Then, from the chronological section corresponding to each type of organ, a plurality of in-vivo lumen images is extracted; and, based on the pieces of feature data of each of the extracted in-vivo lumen images, a reliability calculation criterion is set for each type of organ. Herein, as described above in the fourth embodiment, the mucosal color appearing in the in-vivo lumen images varies depending on the type of organ captured therein. According to the sixth embodiment, the reliability calculation criterion for each type of organ can be calculated by referring to the pieces of feature data of the in-vivo lumen images in which that organ is captured. Then, based on the reliability calculation criterion for the type of organ captured in the target in-vivo lumen image to be processed, the degree of reliability of the normal mucosa regions in that image is calculated; and the degree of reliability is taken into consideration while creating the identification criterion. As a result, it becomes possible to calculate a higher degree of reliability of the normal mucosa regions. Besides, the identification criterion can be created under a condition in which those pieces of feature data which are calculated to have a low degree of reliability are not easily gatherable. That enables achieving enhancement in the accuracy of identifying the normal mucosa regions.

Meanwhile, in the embodiments described above, although the pieces of feature data are assumed to be the average of G/R values and the average of B/G values; the pieces of feature data applicable in the present invention are not limited to such averages and can be set as other values. For example, using the L*a*b* conversion (see CG-ARTS Society, digital image processing, P62-P63), the a*b* value can be obtained from the RGB value of each pixel. Then, the average of the a*b* values in each segmented region can be calculated so that such averages can be set as the pieces of feature data. Alternatively, using the HSI conversion (see CG-ARTS Society, digital image processing, P64-P68), the RGB value can be converted into hue H and saturation S. Then, for example, the average of the hue H and the saturation S in each segmented region can be calculated so that such averages can be set as the pieces of feature data. In the case of considering such other values as the pieces of feature data, the processes that are performed using the average of G/R values and the average of B/G values as the pieces of feature data in the earlier explanation can be performed using the other values obtained as the alternative pieces of feature data.

Moreover, in the embodiments described above, each of the in-vivo lumen images constituting a time-series image is sequentially processed and segmented into segmented regions only for the purpose of reducing the processing load. Thus, segmenting the in-vivo lumen images into segmented regions is not the only option. Instead, it is possible to calculate the pieces of feature data on a pixel-by-pixel basis. In that case, for example, for each pixel, it is possible to calculate the G/R value, the B/G value, the a*b* value, the hue H, or the saturation S as the feature data of that pixel. Then, the processes that are performed with respect to each segmented region in the abovementioned embodiments can be performed with respect to each pixel.

Meanwhile, each of the image processing apparatus 1 according to the first embodiment, the image processing apparatus 1a according to the second embodiment, the image processing apparatus 1b according to the third embodiment, the image processing apparatus 1c according to the fourth embodiment, the image processing apparatus 1d according to the fifth embodiment, and the image processing apparatus 1e according to the sixth embodiment can be put into practice by executing computer programs, written in advance, in a computer system such as a personal computer (PC) or a workstation. Explained below is a computer system that has the functions identical to the functions of the image processing apparatuses 1, 1a, 1b, 1c, 1d, and 1e explained in the first to sixth embodiments, respectively; and that executes the image processing programs 141, 141a, 141b, 141c, 141d, and 141e.

Figure 24:
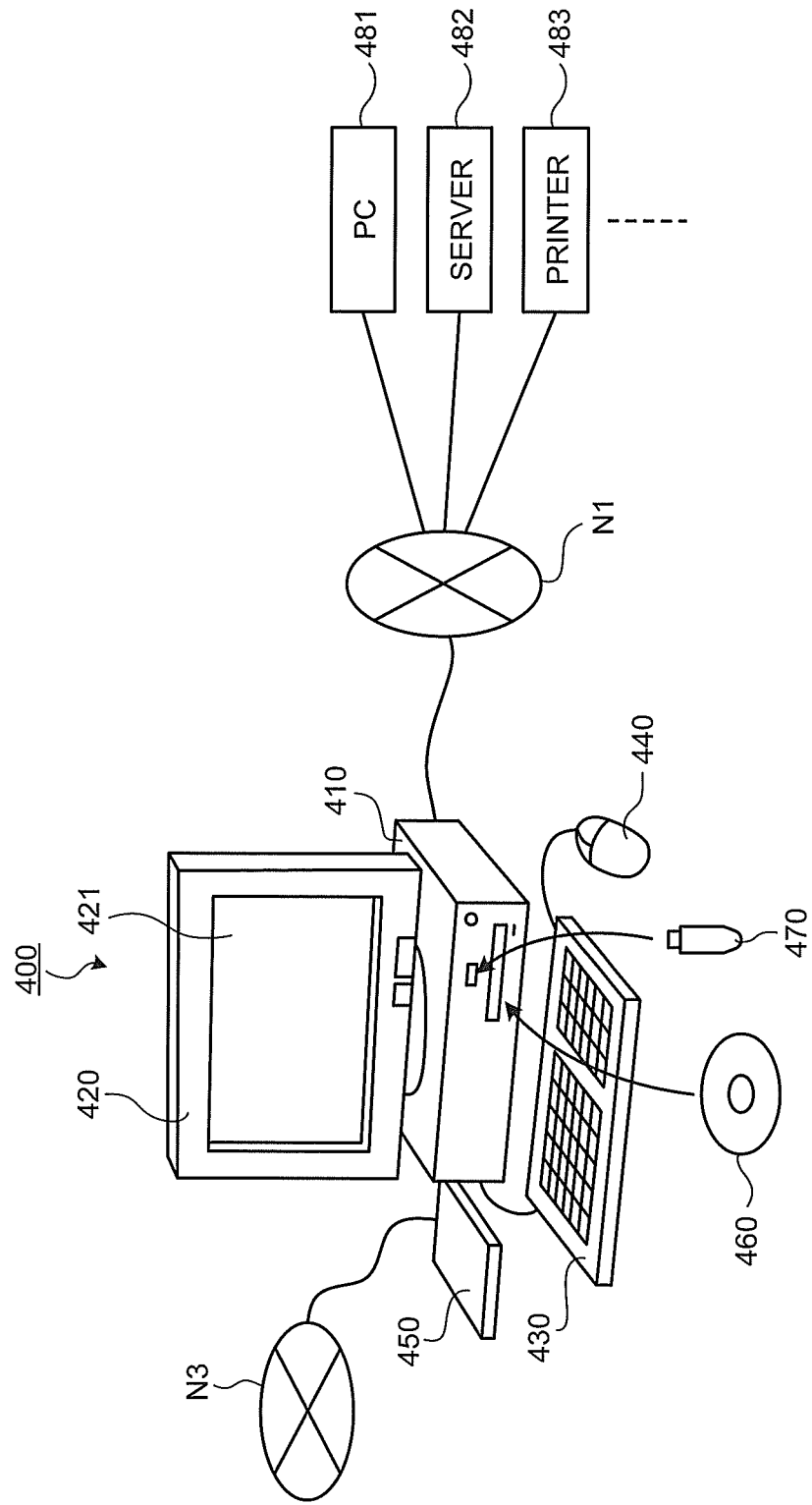
FIG. 24 is an exemplary system configuration diagram illustrating a configuration of a computer system according to a modification example of the present invention.
Figure 25:
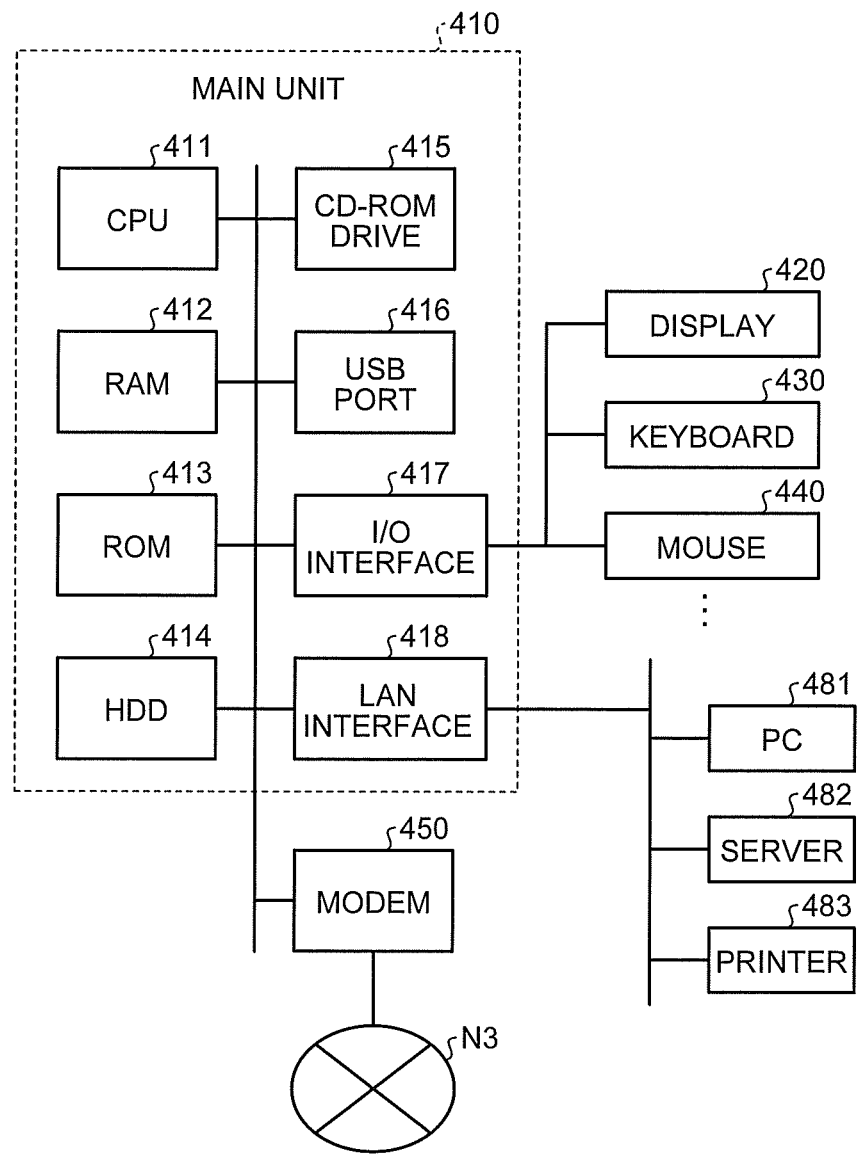
FIG. 25 is an exemplary block diagram of a configuration of a main unit of the computer system illustrated in FIG. 24.

FIG. 24 is an exemplary system configuration diagram illustrating a configuration of a computer system 400 according to a modification example. FIG. 25 is an exemplary block diagram of a configuration of a main unit 410 of the computer system 400. As illustrated in FIG. 24, the computer system 400 includes the main unit 410; includes a display 420 that displays information such as images on a display screen 421 according to an instruction of the main unit 410; includes a keyboard 430 that allows entering a variety of information to the computer system 400; and includes a mouse 440 that allows specifying an arbitrary position on the display screen 421 of the display 420.

Besides, as illustrated in FIG. 24 and FIG. 25, the main unit 410 of the computer system 400 includes a CPU 411; a RAM 412; a ROM 413; an HDD 414; a CD-ROM drive 415 in which a CD-ROM 460 can be inserted; an USB port 416 (USB stands for universal serial bus) to which an USB memory 470 can be detachably attached; an input/output (I/O) interface 417 to which the display 420, the keyboard 430, and the mouse 440 can be connected; and a LAN interface 418 to which a local area network or a wide area network (LAN or WAN) N1 can be connected.

Moreover, to the computer system 400 is connected a modem 450 that enables establishing connection with a public line N3 such as Internet. Furthermore, via the LAN interface 418 and via the LAN or WAN N1, to the computer system 400 is connected other computer systems such as a PC 481, a server 482, and a printer 483.

The computer system 400 reads and executes an image processing program (e.g., the image processing program 141 according to the first embodiment, the image processing program 141a according to the second embodiment, the image processing program 141b according to the third embodiment, the image processing program 141c according to the fourth embodiment, the image processing program 141d according to the fifth embodiment, or the image processing program 141e according to the sixth embodiment) stored in a recording medium so as to perform the functions of an image processing apparatus (e.g., the image processing apparatus 1 according to the first embodiment, the image processing apparatus 1a according to the second embodiment, the image processing apparatus 1b according to the third embodiment, the image processing apparatus 1c according to the fourth embodiment, the image processing apparatus 1d according to the fifth embodiment, or the image processing apparatus 1e according to the sixth embodiment). Herein, apart from the CD-ROM 460 or the USB memory 470, the recording medium can be of any type in which the image processing program readable by the computer system 400 can be stored. For example, the recording medium can also be a "portable physical medium" such as an MO disk, a digital versatile disk (DVD), a flexible disk (FD), a magneto optical disk, or an IC card. Alternatively, the recording medium can also be a "fixed physical medium" such as the HDD 414, the RAM 412, or the ROM 413 that can be disposed inside or outside of the computer system 400. Still alternatively, the recording medium can also be a "communication medium", such as the public line N3 connected via the modem 450 or can be the LAN or WAN N1 to which the other computer systems such as the PC 481 and the server 482 are connected, that holds computer programs for a short period of time at the time of transmission.

Thus, the image processing program is stored in a computer-readable manner in a recording medium such as a "portable physical medium", a "fixed physical medium", or a "communication medium". The computer system 400 reads the image processing program from the recording medium and executes the same so as to perform the functions of the image processing apparatus. Meanwhile, the present invention is not limited to the case when the computer system 400 executes the image processing program. Alternatively, it is also possible to implement the present invention when the other computer system such as the PC 481 or the server 482 executes the image processing program or when the computer system 400 and the other computer systems execute the image processing program in tandem.

Moreover, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. For example, the constituent elements, as a whole or in part, can be separated or integrated either functionally or physically.

In this way, according to an aspect of the present invention, it becomes possible to accurately identify specific regions in the images constituting a set of time-series images of an image-capturing target that are captured in chronological order.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Note

What is claimed is:

1. An image processing apparatus for processing a set of time-series images of an image-capturing target that are captured in chronological order, the image processing apparatus comprising:
    an image selecting unit that selects, in chronological order, a target image to be processed from among images constituting the set of time-series images;
    an identification criterion creating unit that creates an identification criterion so as to enable identification of a specific region in the target image to be processed;
    a feature data calculating unit that calculates a feature data for each pixel or for each small region in the target image to be processed; and
    a specific region identifying unit that, based on the feature data calculated for each pixel or for each small region, identifies a specific region in the target image to be processed by using the identification criterion, wherein
    the identification criterion creating unit creates the identification criterion based on a feature data of the specific region in such an image that has been already selected as the target image to be processed by the image selecting unit and that has been already subjected to identification by the specific region identifying unit.

2. The image processing apparatus according to claim 1, wherein
    the identification criterion creating unit includes
        an initial value setting unit that sets an initial value of the identification criterion; and
        a weighted average calculating unit that calculates a weighted average of the initial value and of the feature data of the specific region in the image that has been already subjected to identification, and
    the identification criterion creating unit creates the identification criterion based on the weighted average.

3. The image processing apparatus according to claim 1, wherein
    the specific region identifying unit includes a clustering unit that performs clustering of the distribution of the feature data calculated for each pixel or for each small region, and
    the specific region identifying unit identifies the specific region in each cluster obtained as a result of the clustering.

4. The image processing apparatus according to claim 2, wherein
    the initial value setting unit includes an initial-value image extracting unit that extracts a plurality of images from the set of time-series images, and
    based on pieces of feature data of the extracted images, the initial value setting unit sets the initial value.

5. The image processing apparatus according to claim 4, wherein
    the initial-value image extracting unit includes an initial-value section setting unit that sets a chronological section from which the images are to be extracted, and
    the initial-value image extracting unit extracts the images from the chronological section.

6. The image processing apparatus according to claim 5, wherein
    the image-capturing target is an in-vivo lumen,
    the initial-value section setting unit includes an initial-value organ identifying unit that identifies a type of organ captured in the images constituting the set of time-series images, and
    based on an identification result of the type of organ, the initial-value section setting unit sets the chronological section.

7. The image processing apparatus according to claim 2, wherein
    the initial value setting unit includes
        an initial-value weighted average calculating unit that sequentially processes images constituting an initial value setting section which constitutes the set of time-series images, and that, by setting higher weights in proportion to closer chronological distances between the image that has been recently processed and images that have been already processed, calculates a weighted average of pieces of feature data of specific regions in the images constituting the initial value setting section; and
        a termination control unit that, as soon as all of the images constituting the initial value setting section are processed, controls termination of weighted average calculation, and
    as the initial value, the initial value setting unit sets the weighted average obtained at the time of termination of the weighted average calculation.

8. The image processing apparatus according to claim 7, wherein
    based on the chronological order of the latest image in the initial value setting section, the image selecting unit selects the target image to be processed in reverse chronological order, and, once the chronologically earliest image is selected as the target image to be processed, selects a target image to be processed on the chronologically latter side of the latest image in the initial value setting section, and
    when the image selecting unit selects the latest image in the initial value setting section as the target image to be processed, the initial value setting unit resets the identification criterion to the weighted average that is obtained at the time of termination of the weighted average calculation and that has been set as the initial value.

9. The image processing apparatus according to claim 2, wherein
    the initial value setting unit includes an initial-value weighted average calculating unit that, within the initial value setting section constituting the set of time-series images, sets higher weights in proportion to closer chronological distances with the chronologically latest image and calculates a weighted average of pieces of feature data of specific regions in the images in the initial value setting section; and a termination control unit that controls termination of weighted average calculation according to the value of the weighted average, and as the initial value, the initial value setting unit sets the weighted average obtained at the time of termination of the weighted average calculation.

10. The image processing apparatus according to claim 2, wherein the weighted average calculating unit includes a chronological-distance weight setting unit that, with respect to the feature data of the specific region in the image that has been already subjected to identification, sets a weight based on a chronological distance between the image that has been already subjected to identification and the target image to be processed, and the weighted average calculating unit calculates the weighted average according to the weight based on the chronological distance.

11. The image processing apparatus according to claim 10, wherein, closer the chronological distance, the chronological-distance weight setting unit sets a higher weight based on the chronological distance.

12. The image processing apparatus according to claim 2, wherein the weighted average calculating unit includes a reliability calculating unit that calculates a degree of reliability of the specific region in the target image to be processed; and a reliability weight setting unit that, with respect to the feature data of the specific region in the target image to be processed, sets a weight based on the degree of reliability, and according to the weight based on the degree of reliability, the weighted average calculating unit calculates a weighted average of the feature data of the specific region in the target image to be processed.

13. The image processing apparatus according to claim 12, wherein the reliability calculating unit calculates the degree of reliability based on the feature data of the specific region.

14. The image processing apparatus according to claim 13, wherein the reliability calculating unit includes a statistic calculating unit that calculates a statistic of the feature data for each pixel or for each small region that has been identified by the specific region identifying unit as the specific region in the target image to be processed, and based on the statistic, the reliability calculating unit calculates a degree of reliability of the specific region.

15. The image processing apparatus according to claim 13, wherein the reliability calculating unit includes an adjacent region identifying unit that identifies an adjacent region positioned adjacent to the segmented region, and based on an identification result regarding the adjacent region, the reliability calculating unit calculates a degree of reliability of the specific region.

16. The image processing apparatus according to claim 13, wherein the reliability calculating unit includes a reliability-calculation-criterion setting unit that sets a reliability calculation criterion to be used for calculating the degree of reliability, and based on the feature data of the specific region, the reliability calculating unit calculates a degree of reliability of the specific region using the reliability calculation criterion.

17. The image processing apparatus according to claim 16, wherein, as the reliability calculation criterion, the reliability-calculation-criterion setting unit sets the identification criterion that is set by the specific region identifying unit for identifying the specific region in the target image to be processed.

18. The image processing apparatus according to claim 16, wherein the reliability-calculation-criterion setting unit sets the reliability calculation criterion based on the distribution of the feature data calculated for each pixel or for each small region that is not identified by the specific region identifying unit as the specific region in the target image to be processed.

19. The image processing apparatus according to claim 16, wherein the reliability-calculation-criterion setting unit includes a reliability-calculation-image extracting unit that extracts a plurality of images from the set of time-series images, and based on pieces of feature data of the extracted images, the reliability-calculation-criterion setting unit sets the reliability calculation criterion.

20. The image processing apparatus according to claim 19, wherein the reliability-calculation-image extracting unit includes a reliability section setting unit that sets a chronological section from which the images are to be extracted, and the reliability-calculation-image extracting unit extracts the images from the chronological section.

21. The image processing apparatus according to claim 20, wherein the reliability section setting unit includes a reliability organ identifying unit that identifies a type of organ captured in the images constituting the set of time-series images, and based on an identification result of the type of organ, the reliability section setting unit sets the chronological section.

22. The image processing apparatus according to claim 12, wherein the reliability calculating unit includes a non-specific region identifying unit that determines whether there exists any pixel or any small region that is not identified by the specific region identifying unit as the specific region in the target image to be processed, and based on whether there exists any pixel or any small region that is not identified as the specific region, the reliability calculating unit calculates the degree of reliability.

23. The image processing apparatus according to claim 1, wherein the image-capturing target is an in-vivo lumen, and the specific region is a region of normal mucosa on the inner wall in the in-vivo lumen.

24. An image processing method comprising:

selecting, in chronological order, a target image to be processed from among images constituting a set of time-series images of an image-capturing target that are captured in chronological order;

creating an identification criterion so as to enable identification of a specific region in the target image to be processed;

calculating feature data for each pixel or for each small region in the target image to be processed; and identifying, based on the feature data calculated for each pixel or for each small region, a specific region in the target image to be processed by using the identification criterion, wherein the creating includes creating the identification criterion based on a feature data of the specific region in such an image that has been already selected as the target image to be processed and that has been already subjected to identification.

25. A non-transitory computer-readable recording medium with an executable program stored thereon, wherein the program instructs a processor to perform:

selecting, in chronological order, a target image to be processed from among images constituting a set of time-series images of an image-capturing target that are captured in chronological order;

creating an identification criterion so as to enable identification of a specific region in the target image to be processed;

calculating feature data for each pixel or for each small region in the target image to be processed; and identifying, based on the feature data calculated for each pixel or for each small region, a specific region in the target image to be processed by using the identification criterion, wherein the creating includes creating the identification criterion based on a feature data of the specific region in such an image that has been already selected as the target image to be processed and that has been already subjected to identification.

* * * * *